United States Patent [19]

Baumann, Jr. et al.

[11] 4,381,541

[45] Apr. 26, 1983

[54] BUFFER MEMORY REFERENCING SYSTEM FOR TWO DATA WORDS

[75] Inventors: Charles G. Baumann, Jr., Centerville; Michael Danilenko, West St. Paul, both of Minn.

[73] Assignee: Sperry Corporation, New York, N.Y.

[21] Appl. No.: 182,020

[22] Filed: Aug. 28, 1980

[51] Int. Cl.³ .............................................. G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,670,309 | 6/1972 | Amdahl et al. | 364/200 |
| 3,967,247 | 6/1976 | Anderson et al. | 364/200 |
| 4,168,541 | 9/1979 | De Karske | 364/200 X |
| 4,169,284 | 9/1979 | Hogan et al. | 364/200 |

*Primary Examiner*—Raulfe B. Zache
*Attorney, Agent, or Firm*—Charles A. Johnson; Kenneth T. Grace; Marshall M. Truex

[57] ABSTRACT

A memory accessing system for reading or writing consecutive addressable words is described for use in a set associative memory system. Two high speed buffer memories store words read in blocks from a slower main memory. One buffer stores even addressed words and the other stores odd addressed words. Each buffer memory has a tag memory associated with it for indicating data words stored in the buffer memories. A comparison circuit compares two addresses to be accessed to the tags and provides hit or miss signals for each address indicating residency or non-residency in the buffers. If both addressed words are resident, access to read or write the two consecutive data words is accomplished simultaneously. If either or both addressed words are not resident in the buffers, the main memory is accessed to acquire a block or blocks containing the missing addressed word or words. Consecutively addressed data words can occur within a block or across block boundary. The system examines the addresses and gives an indication when a block boundary crossing is to occur, and provides accessing to read or write sequentially addressed data words across the block boundary crossing simultaneously.

22 Claims, 18 Drawing Figures

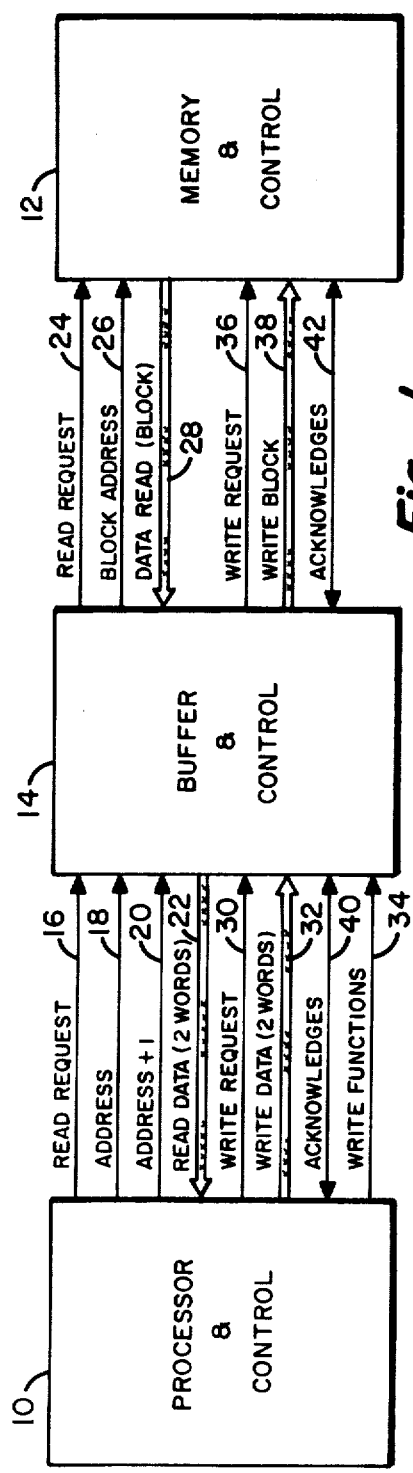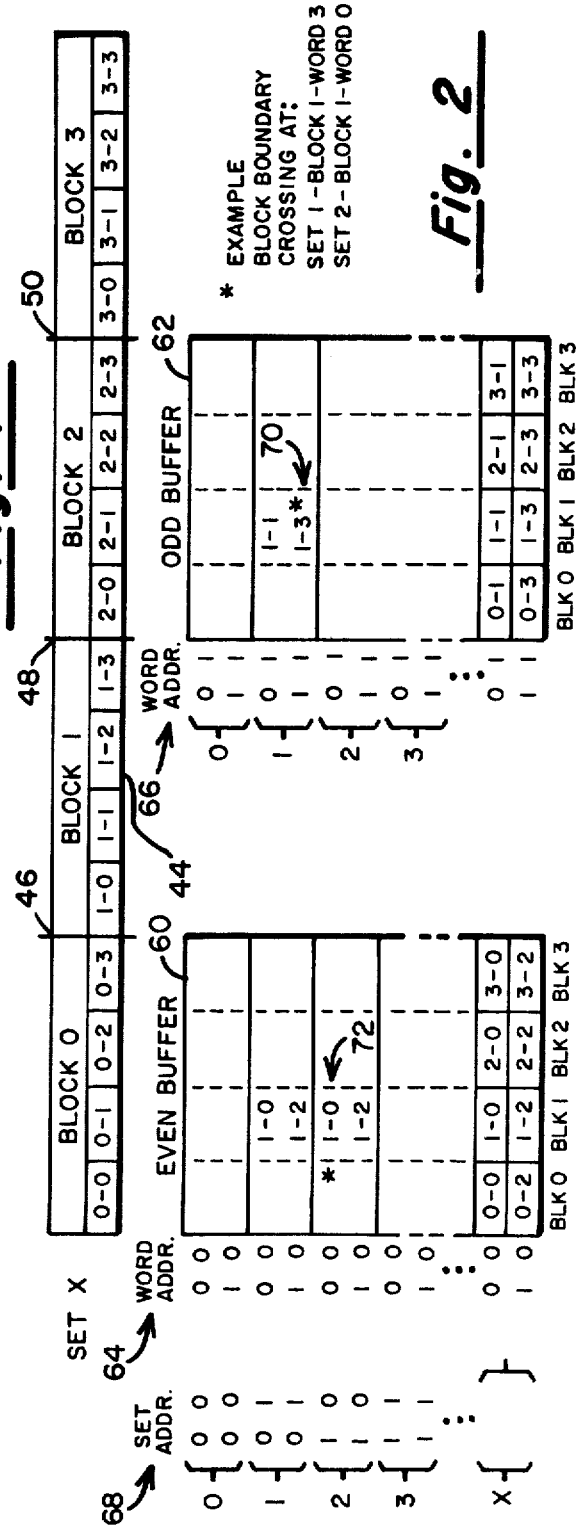
Fig. 1
Fig. 2

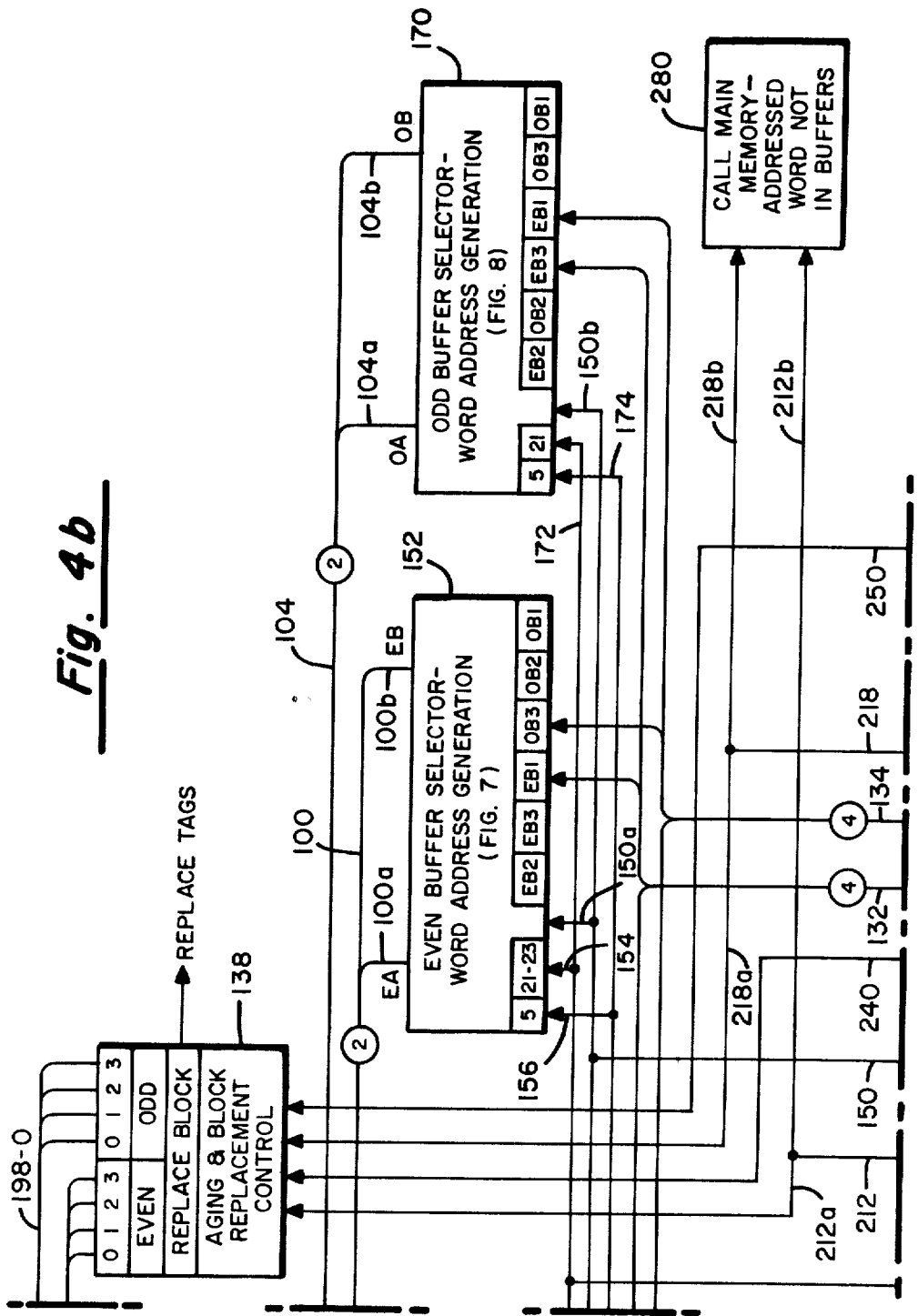

4,381,541

BUFFER MEMORY REFERENCING SYSTEM FOR TWO DATA WORDS

BACKGROUND OF THE INVENTION

In the data processing arts, it has been a consistent goal to achieve faster and faster computing rates. In the development of hardware, circuits have been developed which operate at substantially faster rates than many of the main memory devices. It was recognized that the speed at which data processing operations could be completed were often limited by the cycle time of the main memory. To achieve faster computing rates, it was recognized that through the use of a relatively high speed, low capacity buffer storage device, the effective computing rates could approach that of the computing circuitry, rather than being limited by the cycle time of the main memory. The high speed buffer operates intermediate the data processor and the main memory, and when properly implemented, causes the rate of access to the main memory to appear to approach the speed of the buffer.

The storage interface unit described in U.S. Pat. No. 3,967,247, issued to Andersen, et al., describes a storage interface adapted to serve as a high speed buffer between plural requestor units and a relatively lower speed main memory in a data processing system. The storage interface unit described therein improves on the so-called "cache" buffers implemented in various IBM Computer Systems, and described in various articles identified therein.

In systems utilizing such a high speed buffer memory, it is customary for one or more processor units and one or more input-output units to be adapted to receive instructions and operands, hereinafter collectively referred to as "data" from main memory and to store data in main memory only through the use of the high speed buffer memory. Utilizing the probability that reference to a specific data word will lead to further references to data words in a relatively close proximity of storage addresses, the set-associative memories were developed. When a data word is referenced and it is not determined to be stored in the buffer, a data block comprised of a plurality of data words is transferred from the main memory to the buffer memory. The block of data words thus transferred becomes one of several available blocks of data words resident in the buffer memory. These blocks of data words as requested from main memory, remain resident in the buffer memory until displaced by other blocks of data words called from the main memory. The replacement of blocks of data words is accomplished in the prior art by establishing an aging of reference control for each block such that when block replacement is required the block that has been least referenced is selected for replacement. The U.S. Pat. No. 3,967,247, to Andersen et al., previously mentioned, describes such an aging and block replacement system. A further improved aging and block replacement system is described in the U.S. Pat. No. 4,168,541, to DeKarske, and provides for selection of paired least recently used blocks for replacement.

It is well known and common for data processing systems to utilize instruction words and operands, that is, data words, of a predetermined number of bit positions. In set associative memory systems, a predetermined number of data words comprise a block of data, and a predetermined number of blocks of data comprise a set. As mentioned, it is also common to transfer an entire block of data words to the buffer when one of the data words within the block is referenced. A data processor that utilizes two data words at a time encounter a slow down in data processing rates in prior art systems since it would be normally required to have at least two buffer memory cycles to provide the two data words for the processor. A special problem occurs for data processors having the need for utilizing two data words when the two data words are stored at addresses that require a block boundary crossing for the successive data words. The buffer memory of this invention addresses that problem and provides a system for accessing two data words simultaneously when the two data words are in blocks of data words that are resident in the buffer memory. The simultaneous accessing is possible even though the two data words may be resident in two separate blocks of data words. The simultaneous accessing of two data words results in the computing rates being advanced, and effectively reduces the buffer memory cycle time by half.

SUMMARY OF THE INVENTION

With the foregoing background of the invention in mind, and in accordance with the present invention, an improvement in a digital data processing system utilizing a set associative memory system for accessing two data words simultaneously is described. The present invention is considered to be a significant improvement in set associative memory systems in that two data words can be accessed essentially simultaneously if both words are resident in the buffer memory, and are available during the same buffer reference cycle even if one or both of the accessed words are not resident in the buffer memory system and must be read from the main memory. The present invention is contemplated to be utilized in a set-associative memory system that comprises part of a data processing system. Characteristically, one or more processor units and/or input-output devices are adapted to receive instructions and operands, hereafter collectively referred to as data words, from a main memory storage device by transmission through the high speed buffer memory. The buffer memory, then, becomes the primary interface between processor units, input-output devices, and the main memory.

The two data word access control of the present invention is adapted for use in a set associative memory that utilizes first and second high speed buffer memories, each of which can be independently addressed for either reading or writing access. The buffer memories utilized have a substantially faster cycle time than that of the main memory, and have sufficient capacity for storing blocks of data that will permit the great majority of storage references to take place in the buffer memories rather than requiring access to the main memory system. The first and second buffer memories have first and second means for storing tags representing portions of the main memory addresses for words currently stored in the buffer memories. The main memory is addressably arranged in addressable sets of data, where each addressable set includes four addressable blocks of data, and each addressable block contains four data words. When a specific data word is specified for access in the main memory, the block of four words containing the specified word is transferred to the buffer memory system. The arrangement is such that words having even addresses are stored in one of the buffer memories, and words having odd addresses are stored in the other buffer memory. Each of the set associative buffer memories is organized with a capacity of 512 sets, each set arranged with a capacity of storage of four blocks with four data words each.

Since the data words are divided between the two buffer memories based upon the characteristics of their respective addresses being odd or even, the tag storage devices are also separated into two separate storage devices. The tags define block addresses for blocks stored in the first and second buffer memories. The arrangement is such that the tags for even address sets are stored in one of the tag storage devices, and the tag for the odd address sets are stored in the other tag storage device. It is clear that the system could be expanded to accommodate blocks and sets of data having a different configuration with a larger or smaller capacity, provided the division of words within the buffer memory system continues to utilize the separation based upon odd and even addresses.

When a processor makes a request to access memory, either to read or write, in this system, the request will be to access two data words at consecutive addresses. The processor will supply the two desired word addresses with an indication that the function is to be either a read or write operation. Since the addresses are consecutive, it is clear that one address will be considered an even address, and the other address will be an odd address. The addresses contain indications of the address of the set, the address of the block, and the address of the word. The set address of each of the access words is utilized to address the two tag storage devices for determining the tables for reading out two groups of four block tags each, the two groups of four tags each being applied to separate comparison circuitry for comparison to the block addresses of the two words specified. The result of the comparisons determines whether one or both of the access words are resident in the first and second buffer memories. In the event that either or both of the designated blocks are determined not to be resident in the buffer memories, the block or blocks of data are requested from the main memory and stored in the even and odd buffers as previously described, in accordance with an aging replacement system of the types mentioned in the previously identified United States Patent. The results of the two comparisons and the two word addresses are utilized in circuitry for determining availability of the two words in the first and second buffer memories. The word addresses are also utilized to address the two buffer memories, each word address causing the read out of four data words in parallel for each of the two buffers during a read operation. If a determination has been made that the even address word is present, a hit signal is generated that is utilized to generate selection signals for selecting one of the four words read out from the even word buffer. Similarly, if the odd address word has been determined to be resident in the odd word buffer, a hit signal is generated and is utilized for activating circuitry for generating selection signals for selecting one of the four words read out from the odd word buffer. These functions occur substantially simultaneously, thereby resulting in a read out operation providing the even word and the odd word simultaneously for availability to the processor unit.

When writing, essentially the same selection process goes on as just described, except that the occurence of a hit signal for the even buffer results in the generation of the appropriate word write enable for the even word buffer. Similarly, the odd hit signal results in the generation of the appropriate word write enables for the odd buffer. Again, these functions occur substantially simultaneously and both the odd and the even words are written in their respective buffers at the same time.

If either the even or the odd address words result in a miss signal being generated, the read or write function for the word or words found not to be resident in the two buffer memories are held up until such time as the block or blocks of data containing the data words accessed can be obtained from the main memory and stored in the appropriate buffer memories, as previously described.

The systems for determination of block reference aging, and the systems for writing altered blocks in the main memory are necessary for system operation, and may be of the type described in the above identified United States Patent.

OBJECTS

With the foregoing background and summary of the invention in mind, it is a primary object of the present invention to provide an improved set associative memory system and buffer memory system for simultaneously accessing two data words.

Another object of the invention is to reduce memory reference access time by providing a buffer memory system allowing simultaneous accessing of two data words during a buffer memory reference.

Yet another object is to provide an improved buffer memory system having even address words stored in one buffer memory and odd address words stored in a second buffer memory whereby two sequentially addressed words resident in the first and second buffer memories can be simultaneously accessed for reading or writing.

Still a further object of the invention is to provide separate tag storage devices respectively associated with first and second buffer memory devices for determining which blocks of data are resident in the two buffer memory devices so that it can be determined whether one, both, or neither of two access words are resident in the two buffer memory devices, and to replace blocks of data in said first and second buffer memories with blocks of data from the main storage containing the addressed words that are found not to be resident in the appropriate buffer memory.

Still a further object of the invention is to provide an improved buffer memory system in a set associative memory arrangement wherein two sequentially accessed words resident in the two buffer memories can be simultaneously accessed for reading or writing.

Yet another object of the invention is to provide for accessing two memory words in a set associative buffer memory system even if the two consecutive words are stored at addresses resulting in a block boundary crossing.

DESCRIPTION OF THE DRAWINGS

The foregoing and other objects and advantages of the invention will become apparent to those having skill in the art upon reading the following detailed description taken in conjunction with the accompanying drawings in which:

FIG. 1 is a block diagram of a data processing system utilizing the subject invention simultaneously accessing two data words for reading or writing;

FIG. 2 illustrates the set associative system utilized by the subject invention and provides diagramatic reference for the even buffer and odd buffer and defines block boundary crossing;

DESCRIPTION OF THE PREFERRED EMBODIMENT

Figure 3:
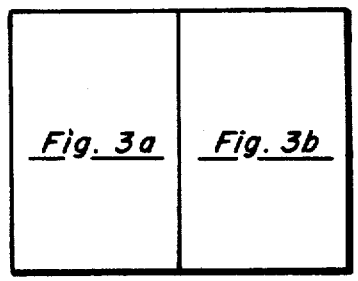
FIGS. 3a and 3b are logic block diagrams of the current invention illustrating the use of even and odd word buffers, two tag store devices, and the selection logic for accessing two data words found resident in the even and odd word buffers.

FIG. 1 illustrates a data processing system which incorporates the invention, and contemplates the use of the Processor and Control 10, a Memory and Control 12, and a Buffer and Control 14, where the Memory 12 comprises a set associative memory system for storing instruction words and operand words, alternatively collectively referred to as "data words", in sets of data words that are addressable. Each set contains a predetermined number of blocks of data words, and each block of data words contains a predetermined number of data words. For this embodiment, as will be described in more detail in reference to FIG. 2, each set of data words includes four blocks of data and each block contains four data words. The Processor 10 can be considered as a requestor, and it should be understood that the requestor could either be a processor or an input/output device, and it should be further understood that there may be several requestors coupled to the Buffer Control 14. In the event that more than one requestor is utilized, a priority arrangement of the type described in the U.S. Pat. No. 3,967,247, to Andersen et al., would be utilized. For purposes of illustration of the system operation, it is sufficient to understand that the Processor and Control 10 will issue a read request signal on line 16 when data words are required. At the same time of issuing the read request signal, an address is transmitted on line 18, and an address plus one is transferred on line 20 to the Buffer and Control 14. In a manner that will be described in more detail below, the Buffer and Control 14 determines whether or not the requested data words as defined by the address and address plus one are resident in the buffer memories and if found to be resident will be transmitted over line 22 to the requestor. In the event that one or the other or both of the data words specified by the address and the address plus one are not resident in the Buffer, updating circuitry will provide a read request on line 24 to the Memory 12. A block address will be provided on line 26 defining the data block in which the absent data word is located, and Memory 12 will transmit a block of data over line 28 to the Buffer. If neither word referenced by the address and the address plus one are resident in the Buffer there will be required two references to Memory 12, for reading the two blocks of data necessary to procure the addressed data words.

If both of the accessed data words are resident in the Buffer, they will be made available simultaneously over line 22 to the Processor. If one or the other of the data words specified by the address and the address plus one are not resident in the Buffer, the buffer reference time will be extended by the number of memory cycles necessary to procure the absent word or words from Memory 12.

When the Processor 10 is performing a function that requires the writing of data in the memory, a write request signal is passed on line 30 to the Buffer 14, and the address and address plus one of the destination of the words to be written are transmitted on lines 18 and 20 as previously described. The two words to be written are transmitted on line 32 and are available for writing by Buffer 14. The writing functions are transmitted on line 34, and designate whether the writing function is to be a word write, a part word write, or a block write, as will be described in more detail below. If the address and the address plus one designate blocks that are resident in the Buffer, the writing function progresses for the two words simultaneously. If either or both of the words specified to be located at address and address plus one reference blocks of data that are not resident in the Buffer, it is necessary to reference Memory and load the missing block or blocks in the Buffer. To secure blocks of data words from Memory 12, the reading and transfer progresses as previously described. If a block of data presently stored in the Buffer is to be displaced by a newly acquired block of data, and the displaced block has been altered since it was read from Memory 12, it is necessary to write the displaced block of data back in Memory. This is accomplished by the Buffer transmitting a write request on line 36 and providing the altered block of data on line 38 to be recorded in Memory 12.

Reading and writing functions occurring between Processor 10 and Buffer 14 are controlled by acknowledges transmitted between the units on line 40, and the completion of reading and writing operations between Buffer 14 and Memory 12 are controlled by acknowledges on line 42 between the two units. This type of control is well known in the art and need not be described further.

FIG. 2 illustrates the set associative arrangement of sets, blocks, and data words as utilized in this embodiment of the invention. The Memory 12 is adapted for storing the data in sets and blocks. As shown in FIG. 2, Set X has four blocks identified as Block 0, Block 1, Block 2, and Block 3. Each of the identified blocks contains four addressable data words, each of the data words having a predetermined number of bit positions. When a reference to Memory 12 is made to either read or write data, it is accomplished on a block-by-block basis. The four words referenced in the block for purposes of discussion carry the designation of the block together with a word designation. For example, in Block 1, each of the four words has the designation "1" followed by the word address ranging from 0 through 3. The third word in Block 1 would be denoted as 1-2 as shown be reference 44. Block boundary crossing occurs for sequential references to words such that the block boundary crossing between Block 0 and Block 1 occurs at 46, the block boundary crossing between Block 1 and Block 2 occurs at 48, and the block boundary crossing between Block 2 and Block 3 occurs at 50. Since there are four words per block, they can be individually addressed and selected with two bit positions in an address word, as will be described in more detail below.

In the Buffer 14, there are two associative buffer memory devices, as will be described in more detail below, one designated Even Buffer 60 and the other designated Odd Buffer 62. The word address bit position for Even Buffer 60 are shown in column 64, and the word address bit position for the Odd Buffer 62 are shown in column 66. The set address bit positions are shown in column 68. Considering Set X as an example, it can be seen that there are 16 data words in the total block arrangement, one half of which will have odd addresses and one half of which will have even addresses. The even address words will be distributed in the Even Buffer 60 and the odd address words will be distributed in the Odd Buffer 62 as illustrated. It can be seen therefore that the Even Buffer 60 contains one-half of the words in a block, and the Odd Buffer 62 contains the other half of the words in a block. Block boundary crossing can occur between sets. For example, a block boundary crossing occurs when Set 1 Word 3 is referenced as indicated by numeral 70, and Set 2 Word 0 is referenced as indicated by numeral 72. The specific addresses will be described in further detail in consideration of the detailed logic drawings. Since the data words are divided for storage with even address data words being stored in Even Buffer 60 and odd address data words stored in Odd Buffer 62, it can be seen that the least significant bit position need not be utilized from the address in addressing the data words in the buffers.

FIG. 3 is a logic block diagram of a Buffer of the type described with reference to FIG. 1, and incorporates a buffer memory system essentially as taught in U.S. Pat. No. 3,967,247 to which reference can be made for a more complete description of the overall buffer system. The following summary description is for purposes of setting the framework in which the present invention functions. The system includes an Even Word Buffer 60 and an Odd Word Buffer 62 each arranged for storing 512 sets of blocks, there being four blocks per set and four words per block. The convention utilized with regard to FIG. 3 is that the block indicates the functions designated within the blocks, and the arrowheads indicate the direction of data flow or control flow as the case may be. The convention utilized for bit significance in the address word is such that bit position 0 is the most significant bit position with higher numbered bit position designations indicative of lower order significance. The system utilizes an Address Register 80 and an Address+1 Register 82. For a read access, the Processor supplies an address to the Address Register 80 and the Address+1 Register 82. The Address is comprised of 24 bits, and the Address+1 utilizes 6 bits. The least significant bit positions define the word address for both of the addresses supplied. The Address utilizes bit positions 22 and 23 to define the word address and the Address+1 utilizes bit positions 4 and 5 for identifying the word address. Bit positions 13 through 21 of the Address define the set being selected, and when decoded provides the addressing for the selection of one of the 512 sets in the Odd Word Buffer 62. Bit position 13 through 17 form the most significant portion of the set addressing, and in conjunction with bit positions 0 through 4 of the Address+1, provide the selection of the set in the Even Word Buffer 60. The set addressing bits from the Addressing Register 80 are directed on cable 84 to the Even Word Buffer 60, and the portion of the Address+1 Register 82 utilized to complete the set address is passed on line 86 to the Even Word Buffer 60. Similarly, the set address is derived from the appropriate bit positions of Address Register 80 on line 88, and the appropriate bits are derived from the Address+1 Register 82 on line 90 for providing the addressing bits to the Odd Word Buffer 62. The application of the set addresses to Even Word Buffer 60 and Odd Word Buffer 62 results in the selected addressed sets being read from each of the buffers respectively. Even Word Buffer 60 provides the four words output in parallel on line 92-0, 92-1, 92-2, and 92-3 to the One-of-Four Word Selector 94. The selection of the appropriate word will result from the determination that the even addressed word address is resident in the buffer, as will be described below. In a similar fashion, the addresses applied to Odd Word Buffer 62 will result in four data words being provided in parallel, the words being transmitted on lines 96-0, 96-1, 96-2, and 96-3 to the One-of-Four Word Selector 98. Again, this selection of the particular word will be determined by the determination that the odd word is resident in the Odd Word Buffer 62. The One-of-Four Word Selector 94 and 98 are gate circuits of a type available commercially and provide for the application of these four sets of data words in parallel, with the particular word to be selected from Selector 94 in accordance with the two bit positions code selection applied on line 100 resulting in a single even addressed word being provided on output line 102. Similarly, Selector 98 requires a two bit position selection code on line 104 to select one of the four applied data words for transmission on output line 106.

The Address Register 80 utilizes bit positions 0 through 12 to designate the main memory address of the word specified, and in the Buffer system is designated as the Tags. The system utilizes as addressable storage unit identified as the Even Set Tag 110 for storing tags representing the main memory addresses of the words currently resident in the Word Buffers 60 and 62. Similarly the addressable memory device referenced as Odd Set Tag 112 is provided for storing the tags representing the main memory addresses of the words currently resident in the Word Buffer 60 and 62. It is understood that the Even Set Tag 110 and the Odd Set Tag 112 each contain 256 addresses such that there is one address corresponding to each of the sets in the Even Word Buffer 60 and the Odd Word Buffer 62 respectively. The addressing of Even Set Tag 110 is accomplished by receiving address signals from the Address Register 80 over lines 114 in conjunction with signals read from the Address+1 Register 82 over line 116. Similarly, the Odd Set Tag 112 receives address signals from the Address Register 80 over lines 118 to comprise the entire address to access odd tags. The addressing results in four tags being provided in parallel from Even Set Tag 110 on lines 122-0, 122-1, 122-2, and 122-3 to Even Compare circuitry 124. Similarly, the Odd Set Tag 112 provides for four tags in parallel on lines 126-0, 126-1, 126-2, and 126-3 to Odd Compare circuitry 128.

The tag portion of the Address Register 80 is applied on line 130 to Even Compare 124 and Odd Compare 128 via line 130. The Even Compare circuit 124 compares the input tag to the four tags read from the Even Set Tag 110, and if equality comparison is found to exist produces a signal on line 132. Similarly, the Odd Compare circuit 128 compares the input tag to the four tags read from the Odd Set Tag 112, and if equality is found to exist produces a signal on line 134 indicative of the block in which comparison was found to exist.

The output signals from the Even Compare 124 circuitry provided on line 136 as an input to the Aging and Block Replacement circuitry 138, and the output signals from the Odd Compare circuitry 128 provided on line 140 as input signals thereto.

The Even Set Hit/Miss circuitry 142 responds to word address signals received from the Address Register 80 over line 144 and from the Address+1 Register 82 over line 146 in combination with the signal received from the Even Compare 124, all for determining whether or not either of the accessed words are resident in the Even Word Buffer 60. The Even Set Hit/Miss circuitry 142 provides output signals that will be identified as a "Hit" signal and a "Miss" signal dependent upon the determination of residency of the accessed word. If a Hit signal is generated, it is to activate several separate portions of the circuitry. The Hit signal is directed on line 148 to the Aging and Block Replacement circuitry 138 for causing the reference to the block to be updated in the aging record. The advent of a Miss signal on line 148 would result in the replacement of the identified block in a manner described in the previously identified United States Patents. The Hit signal transmitted on line 150 to the Even Word Select circuitry 152 in combination with the word address signals received from the Address Register 80 on line 154 and from the Address+1 Register 82 on line 156 functions to provide a two bit code representation of the selected word address on line 100 for selecting the one of the four words read out of the Even Word Buffer 60. The Hit signal is also applied on line 158 as one of the input control sigals for the Buffer write Control circuitry 160.

The results of evaluation of the tags stored in the Odd Set Tag Memory 112 proceed similarly to that just described, and the Odd Set Hit/Miss circuitry 162 operates in response to the signal received on line 134 from the Odd Compare circuitry 128 and the word address signals are received from the Address Register 80 on line 164 and from the Address+1 Register 82 on line 166 to provide the Hit and Miss signals for the Odd Set. The Odd Hit and Miss signals are provided on line 168 to the Odd Word Select circuitry 170, which circuitry utilizes the word address signals received on lines 172 and 174 to generate the two bit word selection code on line 104 for the selection of the odd word during the read operation. The Odd Hit and Miss signals are provided on line 176 through the Aging and Block Replacement circuitry 138. The Hit signal is also applied on line 178 as one of the input signals to the Buffer Write Control circuitry 160.

For a writing operation, a word having an even address is loaded in the Even Word Write Register 180 from an external source and it is available on line 182 to the data input of the Even Word Buffer 60. The writing operation is under control of the Buffer Write Control 160 which provides enabling signals on line 184 dependent upon a status of the Hit signal for the Even Word Buffer, the status of the word address signal received on lines 186 and 188, and the designation of the Function for Writing received on line 190. The function is a control provided from external sources, and indicates whether the writing operation is to be a Word Write, a Partial Word Write, or a Block Write. In a similar manner, the odd address word that is to be written is transmitted to the Odd Word Write Register 192 for availability to the data input of the Odd Word Buffer 62 over line 194. The Buffer Write Control 160 functions to provide enable signals on line 196 for controlling the writing operation. For Hit conditions for both the Even Word Buffer and the Odd Word Buffer, the writing operation of the sequential addressed words take place essentially simultaneously. In the event that it is necessary to replace one or both of the blocks in the buffers because the reference is to nonresident words, the replacement will be accomplished by the Aging and Block Replacement 138 which provides control signals on line 198 to the Buffer Write Control 160.

The general set associative memory system having the subject invention incorporated therein has been described, in general terms, and the specific logic circuit arrangement and circuit operation will be described in more detail below.

Figure 4:
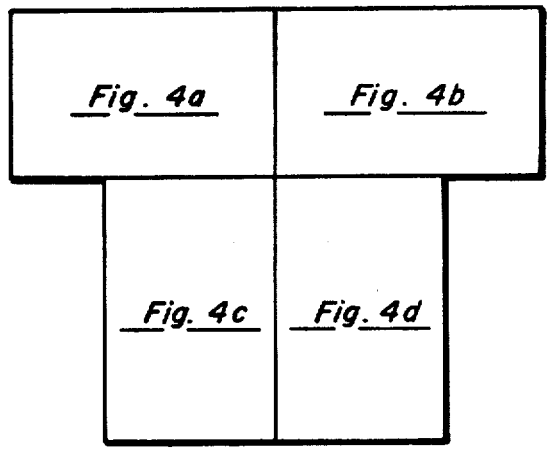
FIG. 4a through FIG. 4d, when arranged as shown in FIG. 4, are collectively a detailed logic diagram illustrating the logical functions utilized to implement the simultaneous accessing of two data words in a set associative memory system.

FIG. 4a through FIG. 4d, when arranged as shown in FIG. 4, are collectively detailed logic diagrams illustrating the logical functions utilized to implement the simultaneous accessing of two data words in a set associative memory system. Elements that have been previously described to which reference numerals have been applied will carry the same reference numeral designations. The Even Word Buffer 60 and the Odd Word Buffer 62 are each random access memory devices having a capacity of 1024 addressable locations, and are memory devices of a type available in the commercial market place. The address for each of the buffers is comprised of bit positions in the Address Register 80 and the Address+1 Register 82. The address for accessing the Even Word Buffer 60 is derived from bit positions 13 through 17 of the Address Register 80 via lines 84, in conjunction with bit positions 0 through 4 from the Address+1 Register 82 via line 86. The accessed word is read out to the Even Word Selector 94 via word cables 92-0, 92-1, 92-2, and 92-3. The Odd Word Buffer is addressed by bit positions 13 through 17 of the Address Register 80 in conjunction with bit positions 18 through 22 of that register, as indicated by lines 88a and 88b. The read out is as previously described, with the set of four words addressed being read to the Odd Word Selector 98 via cables 96-0, 96-1, 96-2, and 96-3. In both instances, the specific word selection will be described in more detail below, it being recalled that the selected even word passes on cable 102 for storage in the Even Word Read Register 200 and the odd word is passed to the Odd Word Read Register 202. Note that the least significant bit position in the Address Register 80 and the least significant bit position in the word address of the Address+1 Register 82 are not utilized in this addressing system.

The Even Set Tags 110 storage device and the Odd Set Tags storage device 112 are each random accessed memory devices that are addressable, and are of a type of memory device commercially available. The addressing is accomplished by applying bit positions 13 through 17 from the Address Register 80 on line 114 to the Even Set Tags 110 address register in conjunction with bit positions 0 through 2 on line 116 from the Address+1 Register 82. The addressing bit positions for the Odd Set Tags 112 are applied from bit positions 13 through 20 via line 118 from the Address Register 80. The set of odd tags thus addressed is read out over lines 126-0, 126-1, 126-2, and 126-3 as four sets of parallel inputs to the Odd Set Match Compare 128.

In both cases of addressing the Even Set Tags 110 and the Odd Set Tags 112, it will be noted that the least significant bit position in the set address portion of the addressing words are not utilized. The least significant bit position in the set address portion of the Address Register 80 is bit position 21, and is utilized in conjunction with word address bits being bit positions 22 and 23 for purposes of determining a block boundary crossing, as will be described in more detail below.

The block address, that is the tag, comprised of bit positions 0 through 12 from the Address Register 80 is applied on line 130 as a parallel input to the four comparitors of the set of Even Set Match Compare circuitry 124 on lines 130-0, 130-1, 130-2, and 130-3, and as four sets of parallel inputs to the set of comparitors comprising the Odd Set Match Compare circuitry 128 on lines 130-4, 130-5, 130-6, and 130-7. The Even Set Match Compare circuitry 124 operates to make four simultaneous comparisons of the tags read from the Even Set Tags 110 storage device and the tag read from the Address Register 80. These comparators are of a type available commercially, and function to provide a low signal, hereafter referred to as L, when equality is detected on the appropriate line 132-0, 132-1, 132-2, or 132-3, it being understood that a comparison signal L will result on only one of the lines during any given comparison operation. For those conditions where comparison is not made, and inequality signal will be a high signal, hereafter referred to as H signal. These four output signals are directed to the Even Set Hit/Miss circuitry 142. In a similar manner, the four tags read from the Odd Set Tags 112 on lines 126-0, 126-1, 126-2, and 126-3 are simultaneously compared to the tag specified in the Address Register 80, by the Odd Set Match Compare circuitry 128. If a match condition is determined to exist, the L signal will be generated on the appropriate one of the lines 134-0, 134-1, 134-2, or 134-3, and applied to the Odd Set Hit/Miss circuitry 162. It is understood that the nonmatching output signals will be H. Bit position 5 from the Address+1 Register 82 is passed on line 146 to the Even Set Hit/Miss circuitry 142 and on line 166 to the Odd Set Hit/Miss circuitry 162. Bit positions 21 through 23 are transmitted to these same circuits on line 144 and 164 respectively.

It is the function of the Even Set Hit/Miss circuitry 142 to determine whether or not the even addressed word is resident in the buffer, and it is the function of the Odd Set Hit/Miss 162 to determine if the odd addressed word is resident in the buffer. A determination of residency of either of the odd or even words in the buffers will be designated as a hit condition and a determination that one or the other, or both of the words are not resident in the buffer will be designated as a miss condition.

Figure 5:
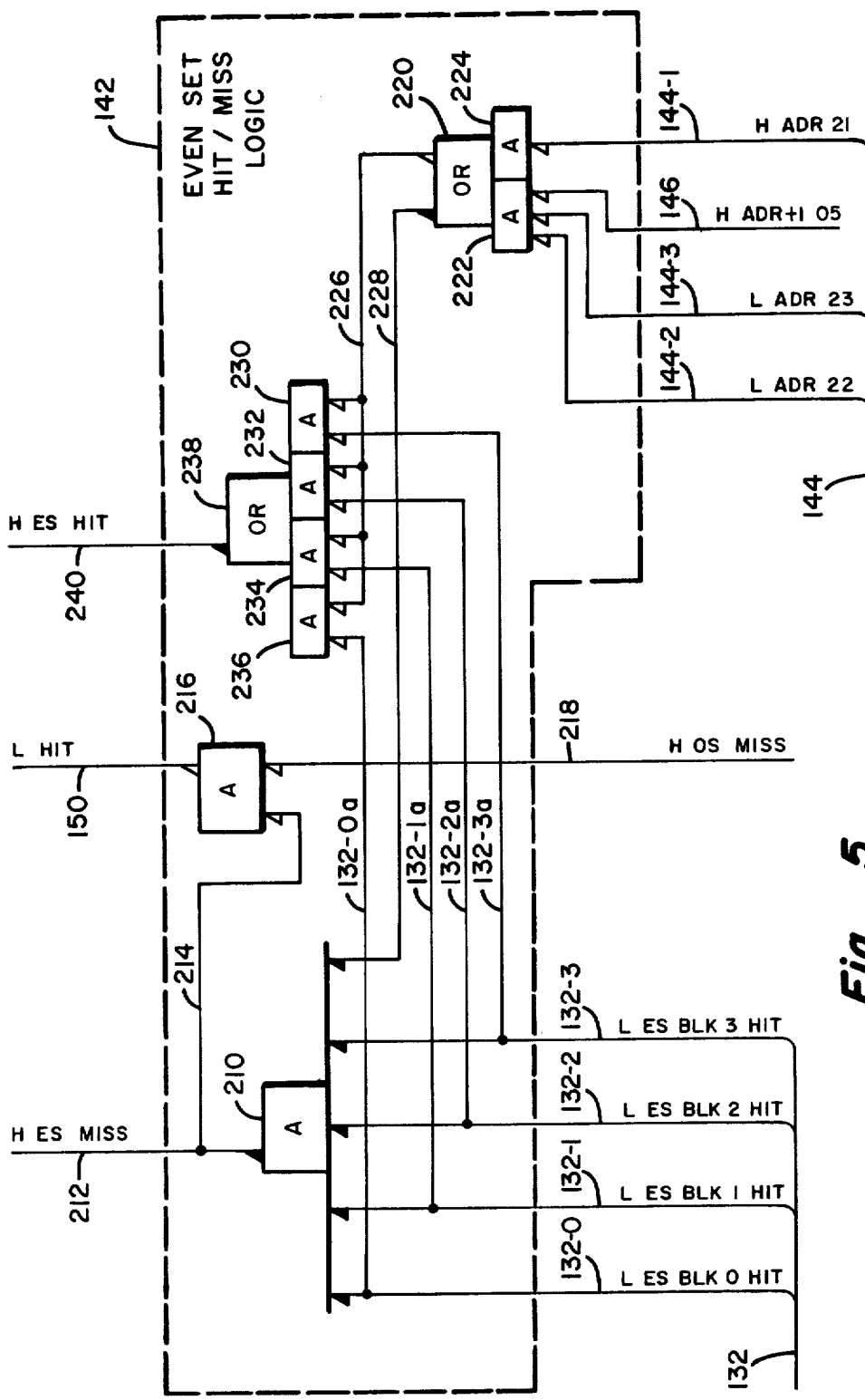
FIG. 5 is the detailed logic block diagram of the Even Set Hit and Miss signal generating circuit.

The detail circuit arrangement of the Even Set Hit/Miss circuitry is shown enclosed in dashed block 142 in FIG. 5. The conventions utilized in the detail logic circuit diagrams will be to designate the true condition of signals on the input lines and output lines in general, a component that has open arrowhead input connections and open arrowhead output designations will be non-inverting, and similarly for closed arrowhead input signals and output designations. An element that has open arrowhead input designations and closed arrowhead output designations will include a signal inversion. Similarly, an element having closed input arrowhead designations and open output designations will involve signal inversions. The application of these conventions will become clearer from a consideration of a discussion of the circuit operations. The circuits are described by their logic function, such as AND, OR, and the like, and are circuits of types that are available commercially. It is not deemed necessary to describe the actual circuit operation since it does not add to an understanding of the invention.

In FIG. 5 the even set miss condition is determined by a 5-input AND circuit 210 which receives inputs on cable 132 from the Even Set Match Compare 124. As previously indicated, a compare condition results in a low signal being generated. AND circuit 210 is an AND circuit that requires 5 high input signals to provide a high output signal, with the high output being indicative of a miss condition. Alternatively, a low signal on any input line will block AND circuit 210 for providing a low signal on output line 212, thereby indicating that the miss condition was not present. The output of AND circuit 210 is also provided as one of the input signals on line 214 to a 2-input AND circuit 216, the output of which produces the L Hit signal on line 150 for controlling further operations of the address selection. The other input signal to AND circuit 216 is received on line 218 and is the H OS Miss received from the circuitry to be described in FIG. 6. The application of a signal indicating an odd set miss will block AND circuit 216 and the L Hit signal will not be present on line 150. If the signal on line 218 is low indicating that the odd set miss signal condition is not present, and the signal on line 214 is low indicating that the even set miss condition is not present, AND circuit 216 will be satisfied and the L Hit signal will be generated. The evaluation of the even set hit condition also involves the evaluation of bit positions 21 through 23 from Address Register 80, and bit position 5 from the Address+1 Register 82. OR circuit 220 has two inputs coupled to a 3-input AND circuit 222 and a single input AND circuit 224, and provides a true output signal on line 226 and an inverted output on line 228. The 3-input AND circuit 222 receives its input signals on line 144-2 and 144-3 for bit positions 22 and 23 respectively and on line 146 for bit position 5 from the address designation. In order to satisfy the conditions of AND circuitry 222, bit 22 of the word address must be low, and bit 23 of the word address must be low, and bit 5 of the Address+1 must be high. These conditions would indicate that the word address in the Address Register 80 is a binary 11, indicating a word address of 3, and that the word address in the Address+1 Register 82 is a 0, indicating a boundary crossing. See the discussion relative to FIG. 2. If these conditions are not satisfied, AND circuit 222 will be blocked and will not activate OR circuit 220. The single input AND circuit 224 is coupled to bit position 21 of the Address Register 80 via line 144-1, and is responsive to a high signal. When no block boundary crossing takes place AND circuit 224 is activated to provide an activating signal to OR circuit 220 for providing the signal on 226 that is applied to the four 2-input AND circuits 230, 232, 234, and 236, which in turn provide input signals to OR circuit 238 for determining the even set hit condition. OR circuit 238 involves inversion, as indicated by the closed arrowhead on output line 240 and the open arrowhead input signal designations to the AND circuits. The four 2-input AND circuits each receive one of the signals from the Even Set Match Compare circuitry 124, with AND circuit 236 receiving the block 0 hit signal on line 132-0a, AND circuit 234 receiving the block 1 hit signal on line 132-1a, AND circuit 232 receiving the block 2 hit signal on line 132-2a, and AND circuit 230 receiving the block 3 hit signal on line 132-3a. When any of the four 2-input AND circuits receive a low signal indicating a hit in the appropriate block, and are enabled by a low signal from OR circuit 220, OR circuit 238 will be satisfied and provide a high output signal designated as H ES Hit.

Figure 6:
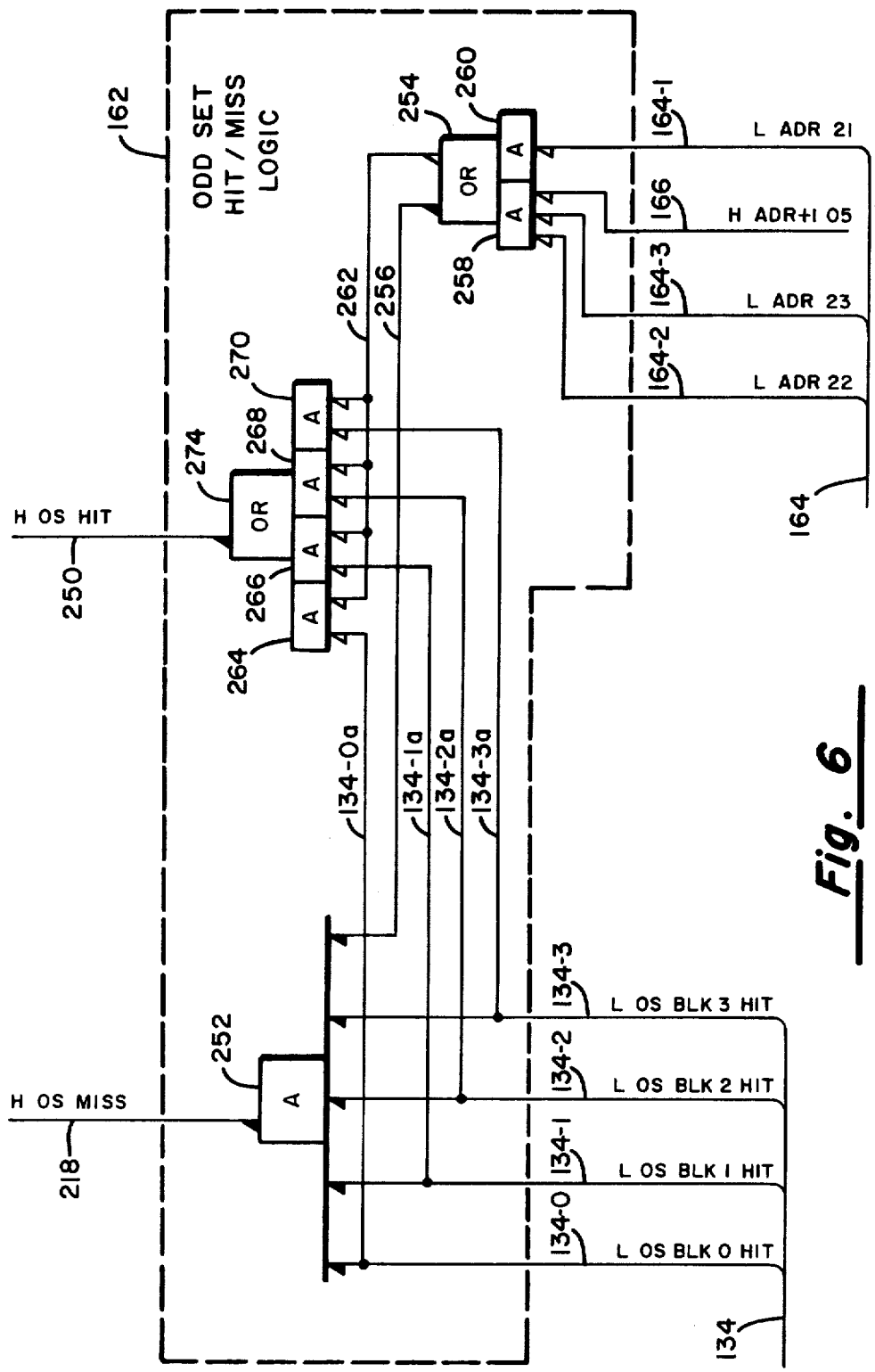
FIG. 6 is a detailed logic block diagram of the Odd Set Hit and Miss signal generating circuit.

FIG. 6 is a detailed logic block diagram of the Odd Set Hit/Miss circuitry 162, and provides a function similar to that described for the even sets in FIG. 5. The circuitry operates to evaluate the odd set match signals derived from the Odd Set Match Compare circuitry 128 in conjunction with the word addressing signals to determine whether or not a hit or miss condition has been generated for the odd set. A Miss condition results in a signal H OS Miss Signal on line 218, and on a hit condition results in a signal H OS Hit Signal on line 250. As previously described, in regard to FIG. 5, the miss condition is determined by a 5-input AND circuit 252 which is arranged to receive signals from the Odd Set Match Compare circuitry 128 on line 134, and functions to evaluate the status of the hit or miss conditions from the odd set compares. As mentioned, a compare signal indicating an equality compare of the tags will be an L signal, and a lack of comparison will result in an H signal. AND circuit 252 receives input signals L OS Block 0 Hit on line 134-0, L OS Block 1 Hit on line 134-1, L OS Block 2 Hit on line 134-2, and L OS Block 3 Hit on line 134-3 together with a signal from OR circuit 254 on line 256. If all of the input signals to AND circuit 252 are H signals, thereby indicating that no hit condition of any of the blocks 0 through 3 existed and that it was not a block boundary crossing situation, the miss condition will be determined to exist, and the H OS Miss signals will be generated on line 218. OR circuit 254 receives input signals from a 3-input AND circuit 258 and AND circuit 260. It functions to determine whether or not the address is in the odd or even set, and to evaluate whether it is a boundary crossing or not. AND circuit 258 receives signals on cable 164 comprising L Address 22 on line 164-2, L Address 23 on line 164-3, and H Address+1 bit 5 on line 166. As previously described the L signals for bit positions 22 and 23 indicate that it is the last word in the block read out, and the H signal for the Address+1 bit 5 position indicates that it is a 0 thereby satisfying the AND conditions for AND 258 and causes OR circuit 254 to provide a low signal on line 262 as an enabling input to AND circuits 264, 266, 268, and 270. Alternatively, a signal L Address 21 as an input on line 164-1 to AND circuit 260 indicates that the lowest ordered bit position of the set address is the numeral 1, thereby indicating an odd address and satisfying one of the conditions to cause OR circuit 254 to issue a low signal on line 262 for enabling a hit determination. If either of the input conditions for OR circuit 254 are satisfied, a high signal will be applied on line 256 thereby enabling AND circuit 252 to be responsive to the signals received on cable 134. OR circuit 274 is responsive to the four 2-inputs AND circuits 264, 266, 268, and 270, the satisfaction of the input conditions for any one of said AND circuits resulting in OR circuit 274 providing an inverted output yielding the H OS Hit signal on line 250. The odd set Hit signals are provided on cable 134 as inputs to the AND circuits, with AND circuit 264 receiving the L OS Block 0 Hit signal on line 134-0a, AND circuit 266 receiving the L OS Block 1 Hit signal on line 134-1a, AND circuit 268 receiving the L OS Block 2 Hit signal on line 134-2a, and AND circuit 270 receiving the L OS Block 3 Hit signal on line 134-3a. When the AND circuits are enabled by the low signal on line 262, they will be responsive to the low signal indicative of a block Hit for causing OR circuit 274 to provide the H OS Hit signal as its output.

As previously described, line 218 provides the H OS Miss signal as one of the input signals to AND circuit 216, and when present deactivates that AND circuit. The absence of the H OS Miss signal on line 218 results in a low signal being applied on line 218, which in combination with a low signal on line 214 results in the L Hit signal on line 150 that is utilized for determining that both of the addressed words are resident in the Buffers. Returning to a consideration of FIG. 4, the Hit and Miss signals for the Even and Odd sets will be utilized for various functions. The H ES Miss signal on line 212 will be applied on line 212a to Aging Block Replacement Control 138 for indicating that an Even Set Miss condition was detected, and causing the selection of a block to be replaced. This same Miss signal is applied on line 212b to Call Main Memory as shown by block 280. It can be seen that the Miss signal results in a Main Memory reference for securing a replacement block, and that the block will be replaced at location specified by the Aging circuitry. If an Even Set Hit condition is detected, the signal on line 240 will be applied to the Aging Block Replacement Control 138 for updating the aging history for the addressed block. In a similar manner if the Odd Set Hit condition is found to exist, the H OS Hit signal is applied on line 250 to the Aging Block Replacement Control for updating the aging history. If the Odd Set Miss condition exists, the signal H OS Miss signal is supplied on line 218a to the Aging Block Replacement Control 138 for selecting a block for replacement, and the signal is applied on line 218b to Call Main Memory for a new word to be placed in the Buffer.

When both the Even Set and Odd Set comparisons are satisfied, and the L Hit signal is generated on line 150, the circuitry proceeds to generate the word selection signals to be applied to the Even Word Selector 94 and the Odd Word Selector 98. These selection signals are generated by the Even Buffer Selector-Word Address Generation circuitry 152 and the Odd Buffer Selector-Word Address Generation circuitry 170. In general, the L Hit signal is applied on line 150a to the Even Buffer Selector 152 and on line 150b to the Odd Buffer Selector 170. The Even Buffer Selector 152 receives input signals from the Address+1 Register 82 on line 156, comprising an input of bit positions 5, and from the Address Register 80 on line 154 comprising bit positions 21 through 23. It also receives input signals from the Even Set Match Compare circuitry 124, on line 132 and from the Odd Set Match Compare circuitry 128 from lines 134. In a similar arrangement, the Odd Buffer Selector 170 receives an input signal from the Address+1 Register 82 on line 174, comprising bit position 5, and from the Address Register 80 on line 172, comprising bit position 21. These word addressing signals in conjunction with the output signal received from the Even and Odd Set Match Compare circuits 124 and 128 on lines 132 and 134 respectively will be utilized to generate the Odd Buffer Word Address Selection signals applied on line 104. In a read operation, it is the function of the Even Buffer Selector 152 which is shown in a detailed logic block diagram in FIG. 7, to provide a 2-bit code for the selection of one of four words to be read, and it is the function of the Odd Buffer Selector 170, which has its detailed logic block diagram illustrated in FIG. 8, to provide a 2-bit code for the selection of one of the four available words read from the Odd Word Buffer 62.

Figure 7:
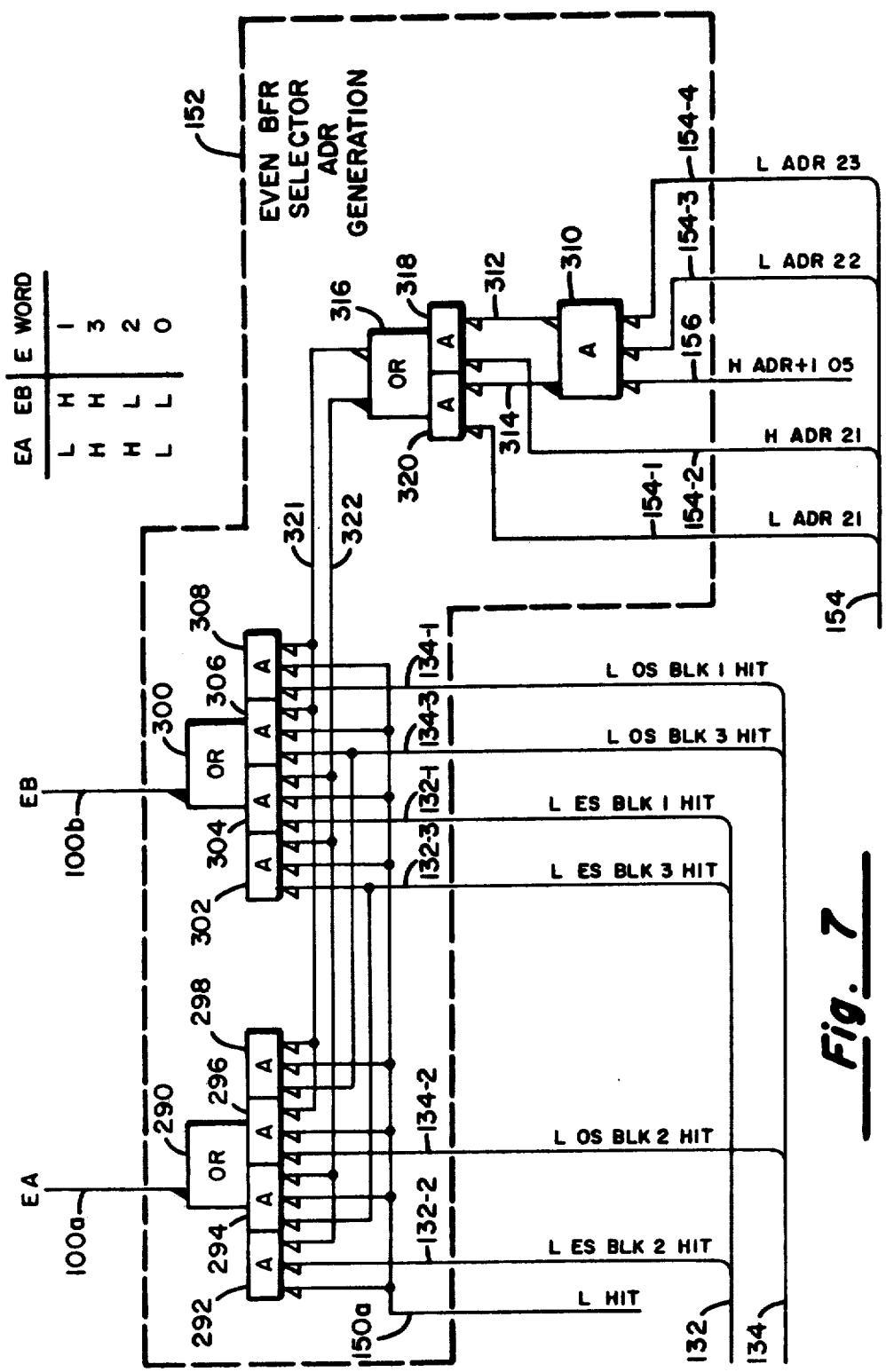
FIG. 7 is a detailed logic block diagram of the Even Buffer Selector and Word Address Generation circuit.

Turning attention to FIG. 7, which is a detailed logic diagram of the Even Buffer Selector and Word Address Generation circuit shown enclosed in dashed block 152, the circuits includes Inverting OR circuit 290 which is utilized to provide the EA portion of the word selection on line 100a. Inverting OR circuit 290 has four 3-input AND circuits 292, 294, 296, and 298. There is also included Inverting OR circuit 300 which provides the signal on line 100b that is designated as the EB address selection signal for the Even Buffer. Inverting OR circuit 300 also utilizes four 3-input AND circuits 302, 304, 306 and 308. The L Hit signal on line 150a is applied to all of the AND circuits inputs to the OR circuits 290 and 300, and functions as an enabling signal when present to allow the selection of an Even Buffer Address Word. If the L Hit signal is high, all of the AND circuits will be disabled.

The circuitry functions to be responsive to Even Set Block Hits in the non-boundary crossing situation, and, alternatively, to the Odd Set Block Hits during the boundary crossing condition. In order to make this selection, a 3-input AND circuit 310 is adapted to receive the L Address bit 22 on line 154-3 and L Address bit 23 on line 154-4. The third input signal is received from the complement output of the Address+1 Register bit position 5, on line 156. This combination of signals of the true output signals from bit position 22 and 23 and the complement from bit position 05 establishes the boundary crossover condition. This follows from the fact that the word address of binary 11 indicates the third word in the Odd Set, and in combination with a binary 0 for the next addressed word. It will be recalled that the L signal is the active signal and in this situation is indicative of the binary 1. The utilization of the complement signal results in an active signal being on the complement output when the stage 05 of the Address+1 Register is set to a 0, thereby satisfying the 3-low signals to activate AND circuit 310. With the 3-input signals satisfied, AND circuit 310 provides an L signal on line 312 and an H signal on line 314. If any of the input signals to AND 310 is an H signal, the signal on line 312 will be an H signal and the signal on line 314 will be an L signal. In order to complete the final evaluation of whether a boundary crossing exists or not, a 2-input OR circuit 316 is fed by a pair of 2-input AND circuits 318 and 320. As previously described, the final evaluation of boundary crossing is dependent on the status of bit position 21 of the Address Register which is the least significant bit of the Set Address. The complement value of bit position 21 is the H Address 21 signal applied on line 154-2 as the other input to AND circuit 318. When bit position 21 is set to a 0, the signal from the complementary output will be an L signal, and in combination with the boundary crossing signal received on line 312 will complete the activation of AND circuit 318 and cause OR circuit 316 to provide an activating L signal on line 321. These conditions will cause OR 316 to provide a H signal on line 322 deactivating the AND circuits to which it is coupled. In the alternative situation, if addressed position 21 is a binary 1, the L Address 21 signal applied on line 154-1 to AND circuit 320 will be an L signal. Therefore, when AND circuit 310 is disabled due to a non-boundary crossing condition with the resultant L signal on line 314, AND circuit 320 will be satisfied and OR circuit 316 will provide the L signal on line 321. In the situation where neither AND circuit 318 or AND circuit 320 are satisfied, OR circuit 316 will provide an L signal on line 322 and a H signal on line 321. From this it can be seen that the switching of the enables from the outputs of OR circuit 316 effectively operates to determine whether the Even Set Block Hits will be utilized, or whether the Odd Set Block Hits will be utilized to generate the word address selection.

The address selection circuitry for the word address code can be best understood by considering that line 322 is coupled for providing signals to AND circuit 292 and 294, and to AND circuits 302 and 304. AND circuit 292 receives its third input signal comprising L ES Block 2 Hit on line 132-2, and AND circuit 294 receives it third input signal L ES Block 3 Hit on line 132-3, and AND circuit 302 receives the same signal as its third input. AND circuit 304 has its third input signal L ES Block 1 Hit on line 132-1. It can be seen that when OR circuit 316 has not had its input conditions satisfied, it indicates that there is no boundary crossing, and the Even Set Block signals are utilized.

The other half of the evaluation involves the AND circuits 296, 298, 306, and 308, which are coupled to line 321 and are enabled when OR circuit 316 has been set. The L OS Block 2 Hit signal is applied on line 134-2 as the third input to AND circuit 296. The L OS Block 3 Hit signal is applied on line 134-3 to both of the AND circuits 298 and 306. The L OS Block 1 Hit signal is applied on line 134-1 as the third input to AND circuit 308. It can be seen OR circuit 316 is activated to provide an L signal on line 321, the Odd Set Hits will be utilized for generating the address code for the Even Buffer. From the foregoing description, it can be seen that the EA output signal from OR circuit 290 on line 100a results in an evaluation of Block 2 or Block 3. Similarly, the EB output signal from OR circuit 300 on line 100b is an evaluation of Block 1 and Block 3. As previously mentioned, OR circuits 290 and 300 are inverting circuits and are operative to provide H signals when any of the AND input circuits are satisfied. In functional terms, then, it can be seen that an EA signal on line 100a indicates the presence of activation for Block 2 or Block 3. At the same time, L signal on line 100b indicates that it is not Block 1 or Block 3, hence the selection indicates that word address 2 is selected. similarly, the presence of an L signal on line 100a indicates that neither Block 2 nor Block 3 was selected. Simultaneously, an H signal on line 100b indicates that either Block 1 or Block 3 satisfied its conditions. This signal combination results in the selection of the Even Word Address to select a word 1. In a similar manner the signals can be traced through the circuitry for the selection of the 0 and 3 word conditions. The signal output combination is shown on the table in FIG. 7 for the Even Buffer Address signal codes to be generated.

Figure 8:
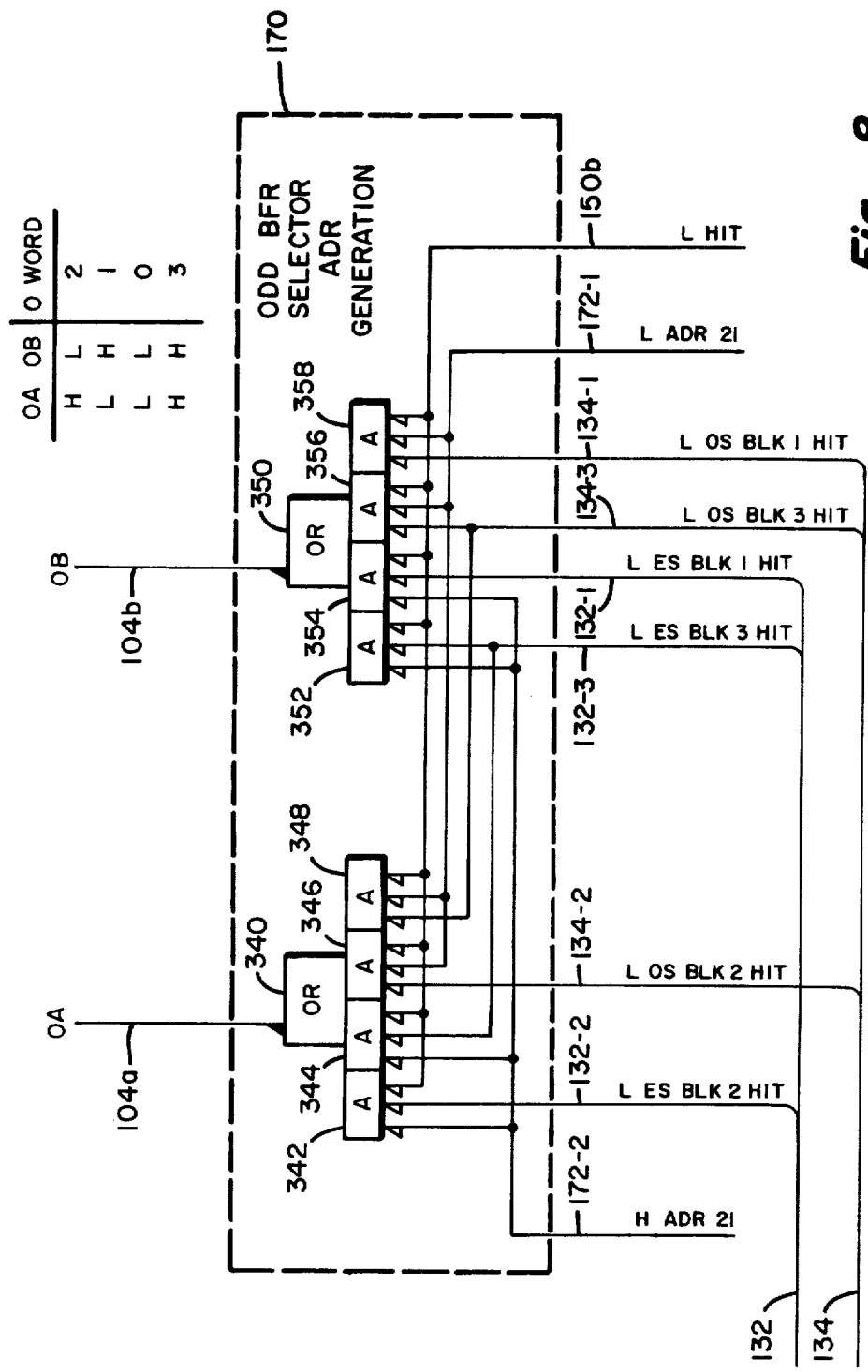
FIG. 8 is a detailed logic block diagram of the Odd Buffer Selector and Word Address Generation circuit.

The Odd Buffer Selector Address Generation circuitry is shown enclosed in dashed block 170 in FIG. 8. This circuitry operates in much the same way as that just described for the Even Buffer, but the determination of boundary crossing is simplified. From the system as described thus far, it can be seen that boundary crossing only occurs from the Odd Buffer to the Even Buffer. This follows from the way word addresses are constructed such that the third word in the last block will be resident in the Odd Buffer, such that the next word will necessarily be located in the Even Buffer. Reference the discussion of FIG. 2. The circuitry includes a 4-input OR circuit 340 providing an inverted output 0A signal on line 104a, the four input lines being coupled to a set of 3-input AND circuits 342, 344, 346, and 348, all for evaluating Block 2 and Block 3 signals. A second 4-input OR circuit 350 is adapted with four 3-input AND circuits 352, 354, 356, and 358, for evaluating Block 1 and Block 3 input signals and providing an inverted 0B signal on line 104b. The input signals are applied L ES Block 2 Hit on line 132-2 to AND circuit 342 and the L OS Block 2 Hit on line 134-2 as an input to AND circuit 346. The L ES Block 3 Hit signal is applied on line 132-3 to AND circuits 344 and 352. The L OS Block 3 Hit signal is applied on line 134-3 as input to AND circuits 348 and 356. The L ES Block 1 Hit signal is applied on line 132-1 as an input to AND circuit 354, and the L OS Block 1 Hit signal is applied on line 134-1 to AND circuit 358. The L Hit signal is applied as an enabling signal on line 150b to all of the AND circuits. The selections between the Even Set Hit signals and the Odd Set Hit signals is determined by the evaluation of address bit position 21. If address bit position 21 is a binary 1, its true output signal will be an L signal. The true output terminal of the register stage that stores the address bit position 21 is applied on line 172-1 as an input signal to enable AND circuits 346, 348, 356, and 358, when the bit position is a binary 1. This selection operates to enable the use of the Odd Set Block Hit signals. The complementary output of the register stage that stores address bit position 21 is applied on line 172-2 as signal inputs to AND circuits 342, 344, 352, and 354, and when address bit position 21 is a binary 0 will provide an enabling L signal for enabling these AND circuits to be responsive to the Even Set Block Hit signals. Without a tracing through each of the possible combinations, which can be readily done by reference to the drawings by those skilled in the art, the table illustrates the Odd Word Selections for the combinations of output signals on lines 104a and 104b. From the foregoing, then, it can be seen that the determination that both addressed words are resident in the Buffer System, results in the L Hit signal operating to select the codes for the selection of the Even Buffer Word and the Odd Buffer Word, and the reading operation has been fully described.

With attention directed back to FIG. 4, the 2-word writing operation will be described. The Buffer Write Control 160 (see FIG. 3) is comprised of a Function Register 400, an Even Buffer Write Control 402, an Odd Buffer Write Control 404, an Even Buffer Write Enables circuit 406, and an Odd Buffer Write Enables circuit 408. The Processor or Requestor, provides a Function Word on line 190 as an input to the Function Register 400, and defines the type of writing operation that is to be accomplished. A code is provided for selecting a Part Word Write, and provides a signal of that selection on line 410. The selection of a Word Write provides a signal on line 412, and a Block Write provides a signal on line 414. In addition to the writing function selections, the Even Buffer Write Control 402 receives the L Hit signal on line 150c, the bit positions 21, 22, and 23, of the address on line 186, and bit position 5 of the Address+1 on line 188. It functions to produce the signals L Enable OS Hit on line 416 or L Enable ES Hit on line 418, together with the L Odd Buffer Write Control signal on line 420. The Odd Buffer Write Control 404 receives the signal on line 420 in conjunction with the L Hit signal on line 150c and bit position 21 of the address on line 186 and operates to generate the signals L Enable OS Hit A on line 422 and the signals L Enable ES Hits A on line 424. It is the function of the Even Buffer Write Control 402 and the Odd Buffer Write Control 404 to evaluate the boundary crossing or non-boundary crossing and provide the appropriate control signals to the Even and Odd Buffer Write Enables circuits 406 and 408. To better understand these various control signals, and how they are generated, attention will be directed to FIG. 9 which is the detailed logic drawing of the Even Buffer Write Control circuitry 402. The function is under the control of 2-input OR circuits 430 and 432 each of which provide signal inversion when activated. The input terminals of OR circuit 430 are controlled by a pair of 2-input AND circuits 434 and 436, while the input lines to OR circuit 432 are controlled by a pair of 2-input AND circuits 438 and 440. The complement of the bit position 23 of the address is applied on line 186-1 as an input to both AND circuits 434 and 436, thus these AND circuits will be enabled when bit 23 is a binary 0. Bit position 23's true state is applied on line 186-2 as enable input to AND circuits 438 and 440, so that they will be enabled when bit 23 of the address is a binary 1, thereby providing the L signal. The L Word Write signal is applied on line 412 as input signals to AND circuits 436 and 440. The L Block Write Control signal is applied on line 414 as input signals to AND circuits 434 and 438. This arrangement, then, results in OR 432 providing the control for the Odd Buffer when address bit position 23 is a 1, by providing an H signal on line 442 as one of the input signals to OR circuit 444. OR circuit 444 provides inversion such that an H signal at one of its input terminals will result in the L Odd Buffer Write Control signal being issued on line 420. The Part Word Write signal received on line 410 is applied as an input signal to OR circuit 444 and OR circuit 446, and when an H signal is received will result in both of these OR circuits providing inverted signals indicative of the Odd Buffer Write Control. If address bit position 23 is a binary 0, the signal on line 186-1 will activate AND circuits 434 and 436 thereby allowing the L Block Write or the L Word Write signals to control OR circuit 430, and if either of these signals is present, the inverted output will be provided as an H signal on line 448 as the alternative control line for OR circuit 446. The output signal on line 450 from OR circuit 446 provides the Even Buffer Write Control and is used internally to this circuit operation.

Figure 9:
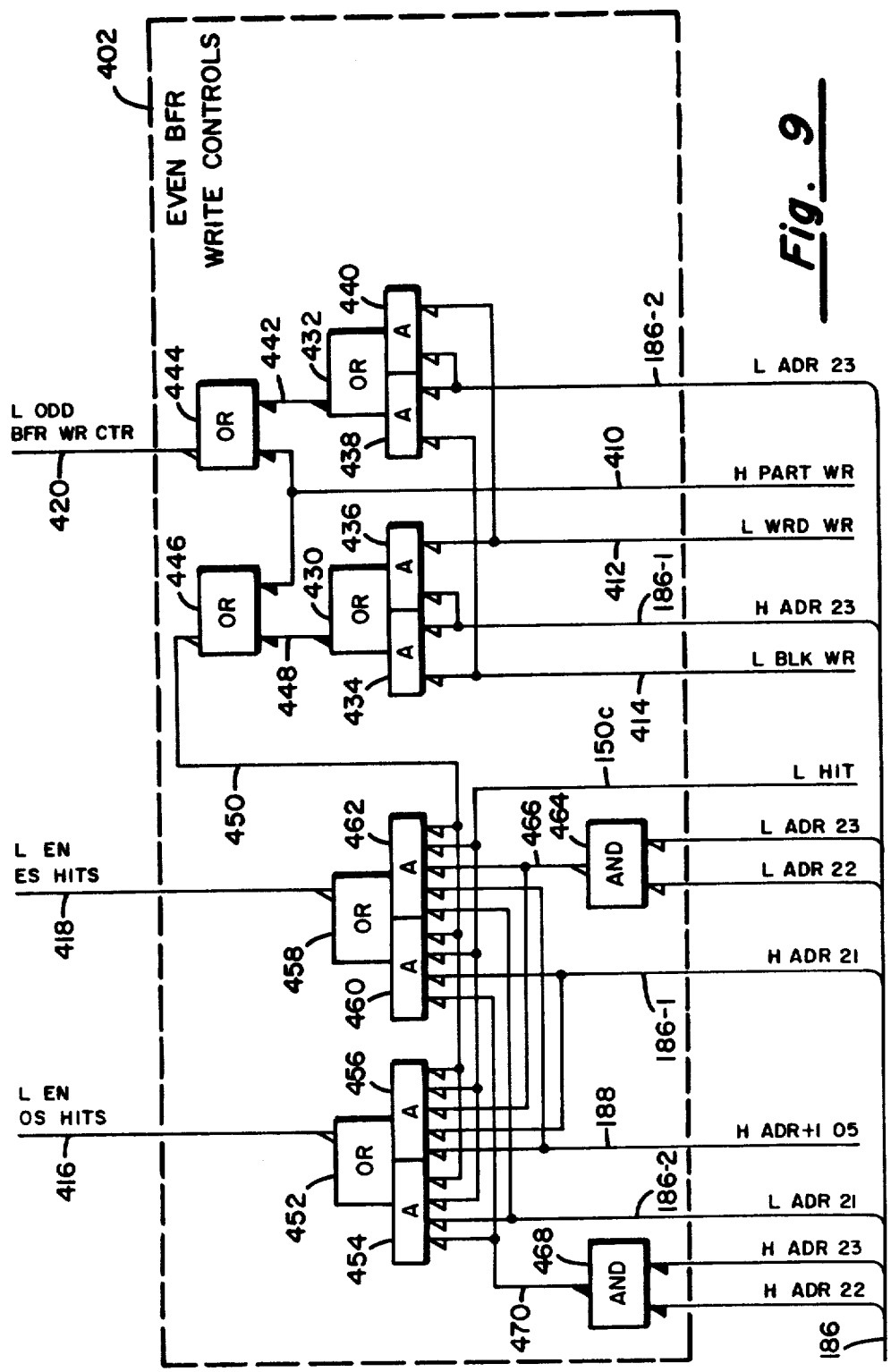
FIG. 9 is a detailed logic block diagram of the Even Buffer Write Control circuit.

The balance of the circuitry in FIG. 9 is utilized to evaluate and generate control signals based upon the condition of boundary crossing or non-boundary crossing. This circuitry includes a non-inverting OR circuit 452 having one of its input terminals coupled to a 4-input AND circuit 454 and the other of its inputs circuits coupled to a 5-input AND circuit 456. OR circuit 452 is non-inverting and provides the L Enable OS Hit signal on line 416 when either of its inputs is activated. OR circuit 458 is a 2-input non-inverting OR circuit that provides the L Enable ES Hit signals on line 418 when either of its inputs are enabled. Its input terminals are coupled to a 4-input AND circuit 460 and a 5-input AND circuit 462. The L Hit signal is applied on line 150c as an enabling input to all of the AND circuits 454, 456, 460, and 462. Similarly, the signal provided from OR circiuit 446 is applied on line 450 as an enabling or disabling signal to all of the AND circuits. The complement of the bit position 21 of the address is applied on line 186-1 as an input to AND circuits 456 and 460. Bit position 5 of the Address+1 is applied on line 188 as an input to AND circuits 456 and 462. The true value of the bit position 21 is applied on line 186-2 as an input to AND circuits 454 and 462. Bit positions 22 and 23 of the address are applied to AND circuit 464, whose output is connected on line 466 as input to AND circuits 462 and 456. The complement values of the address bit positions 22 and 23 are applied to AND circuit 468 which provides its output on line 470 as input signals to AND circuit 454 and 460. Functionally, then, it can be seen that with the OR circuit 446 providing an L signal, and both bit positions 22 and 23 of the address being a binary 1, and bit position 5 of the address 1 being a binary 0, and bit position 21 of the address being a binary 1, that AND circuit 462 is satisfied and OR circuit 458 will provide the L Enable ES Hit signal on line 418. If the same conditions prevail except that bit position 21 of the address is a 0, AND circuit 456 will be satisfied and OR circuit 452 will provide the L Enable OS Hit signal on line 416. If either bit positions 22 or 23 of the address is 0, the output of AND 408 will be low, and the OR circuit 452 and 458 outputs will be dependent upon the value of address bit 21.

Figure 10:
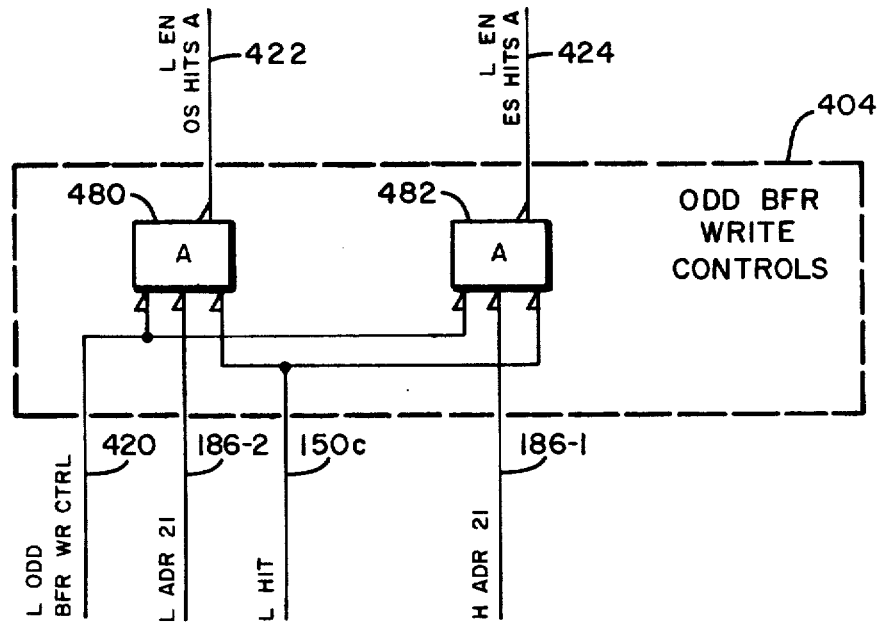
FIG. 10 is a detailed logic block diagram of the Odd Buffer Write Control circuit.
Figure 3A:
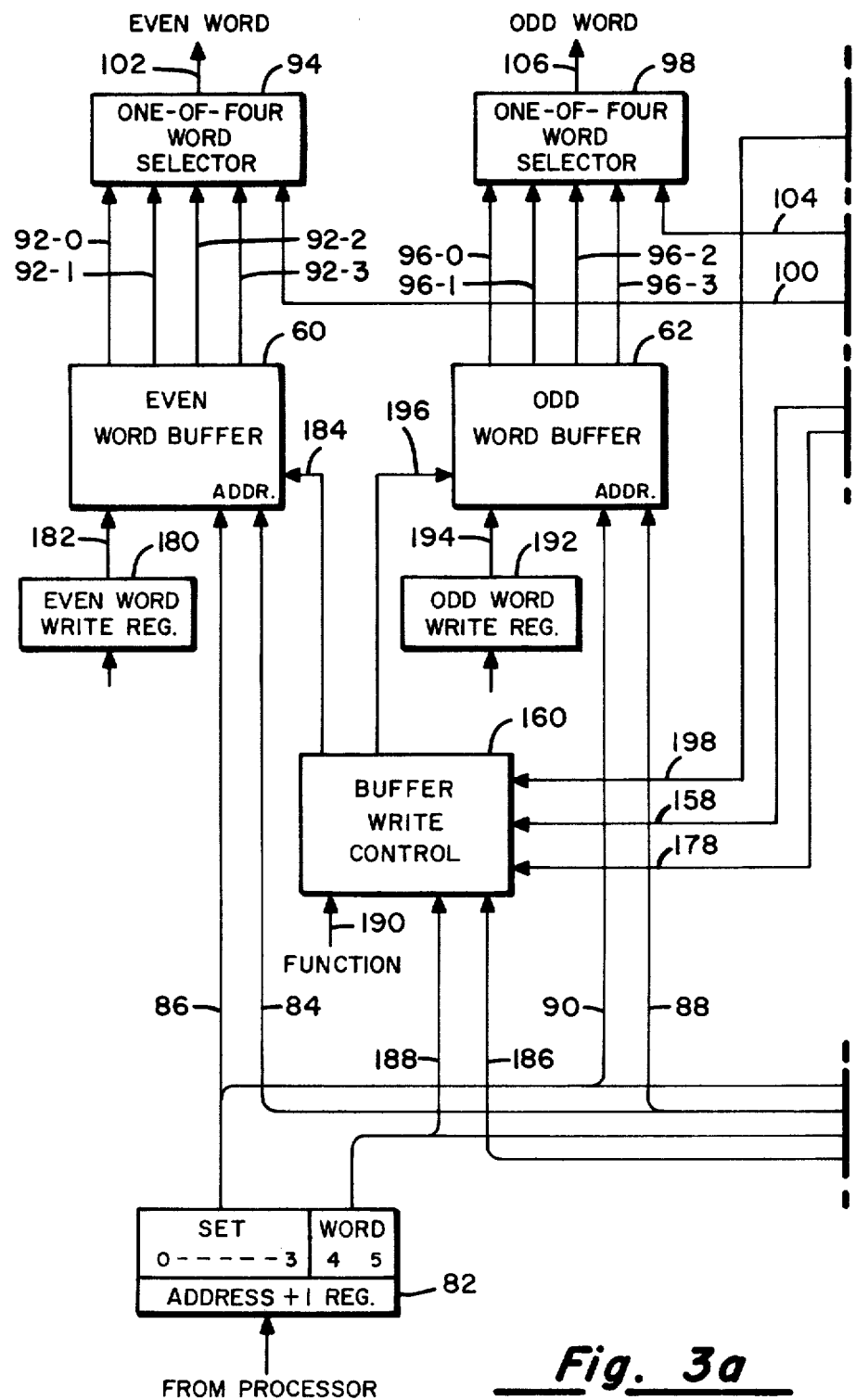
Figure 3B:
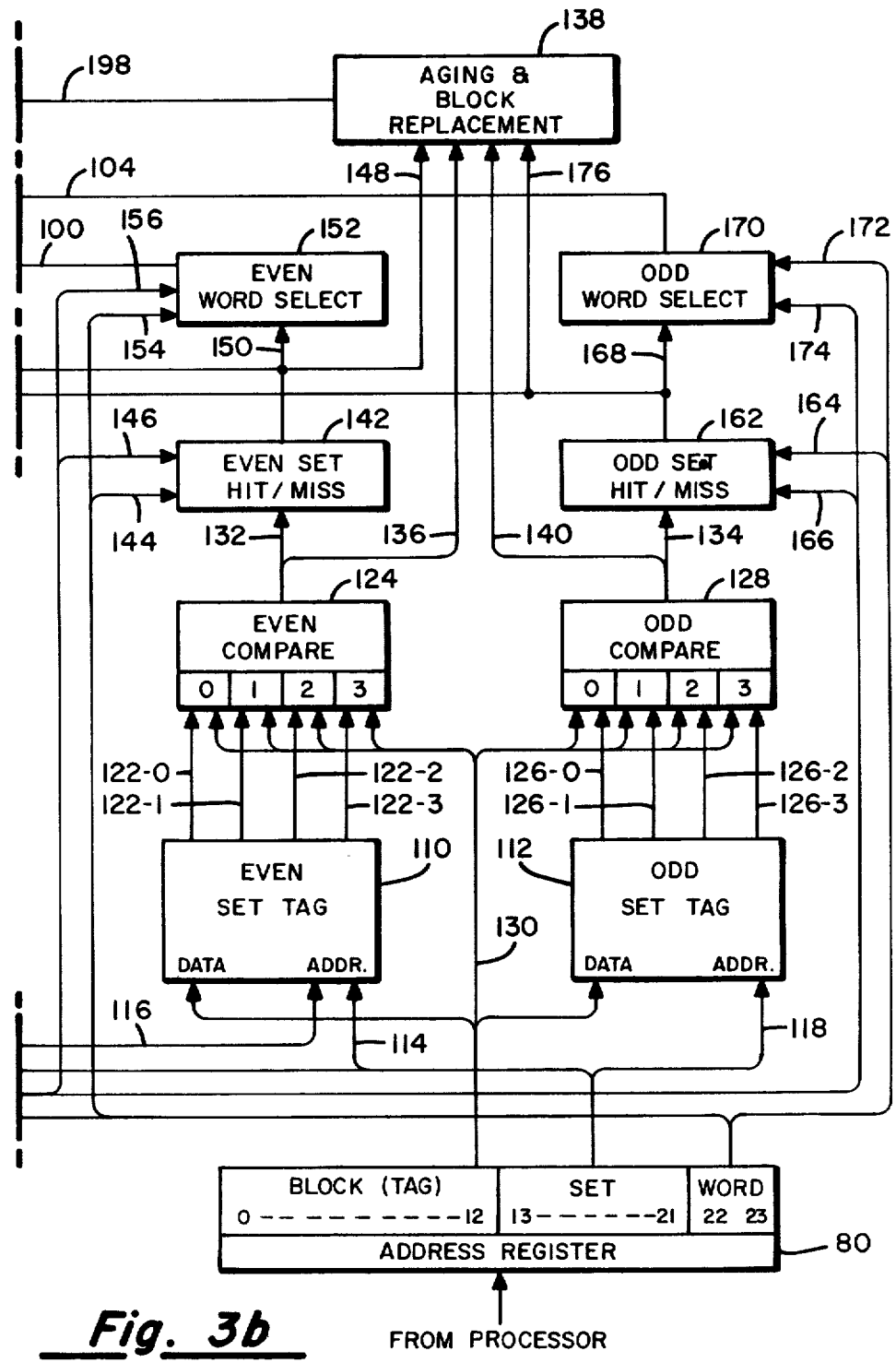
Figure 4A:
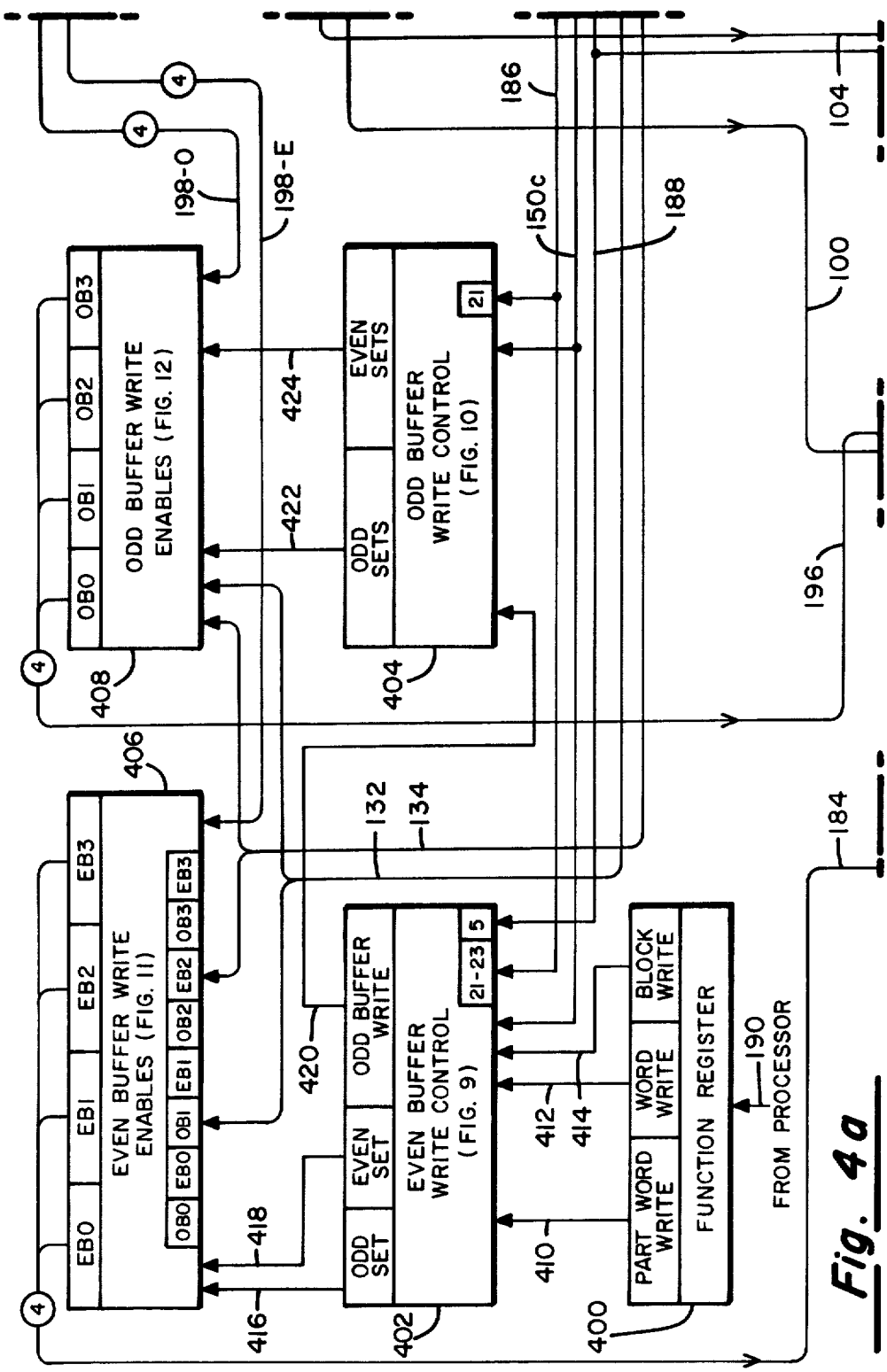
Figure 4C:
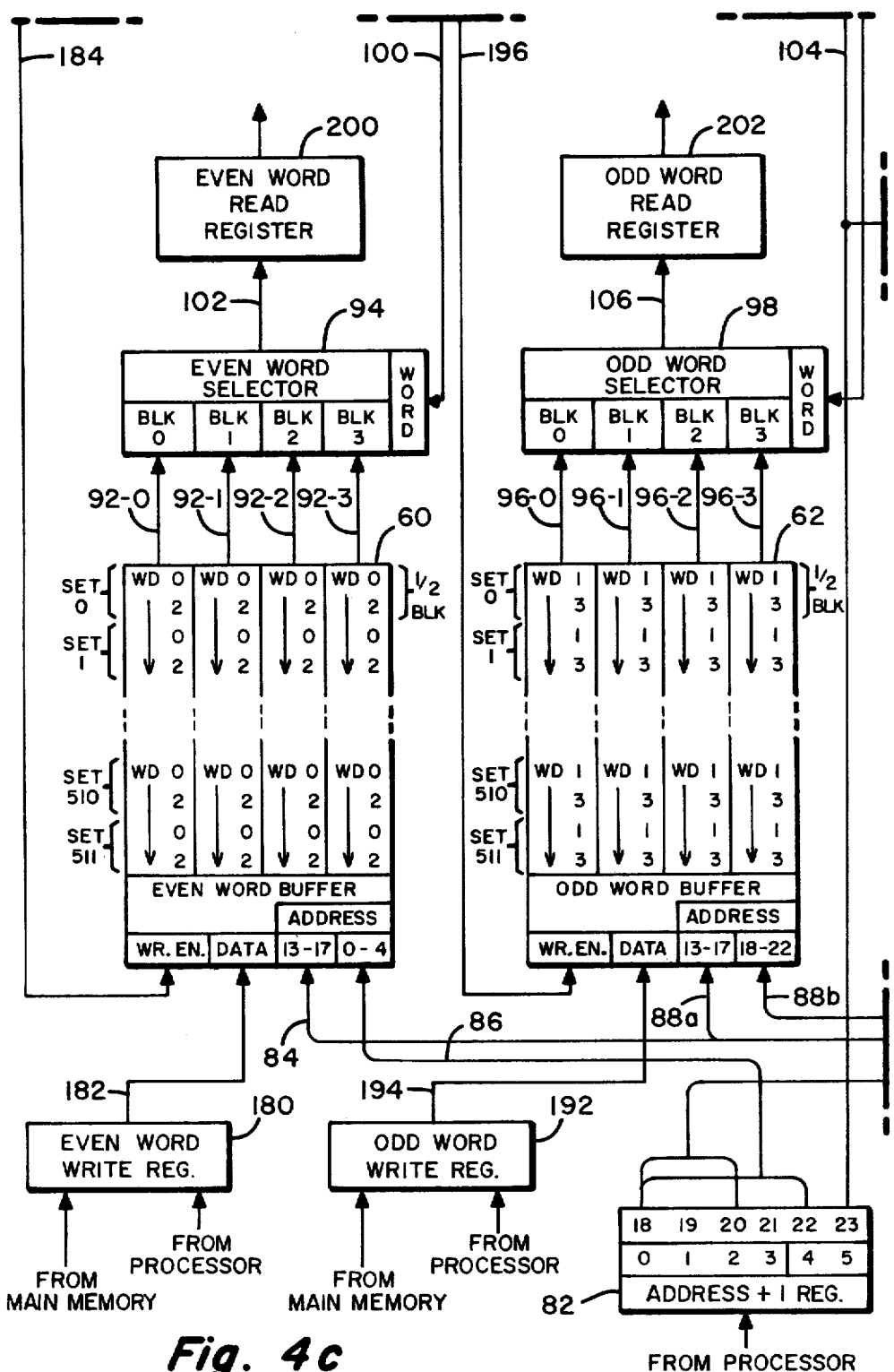
Figure 4D:
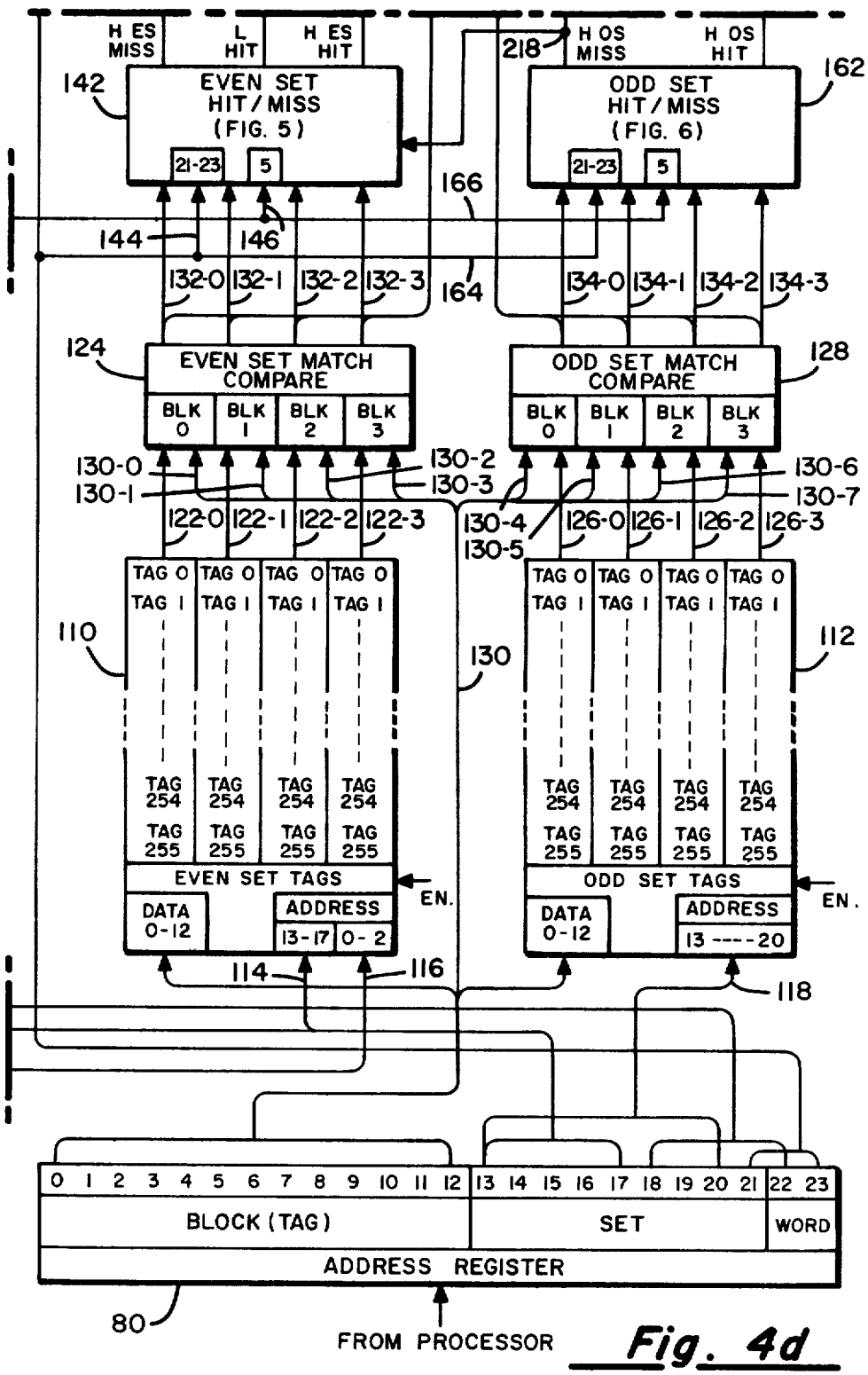

The detail logic circuitry of the Odd Buffer Write Control is shown enclosed in dashed block 404 in FIG. 10. This circuitry includes a pair of 3-input AND circuits 480 and 482. The L Hit signal is applied on line 150c as an input to each of these AND circuits. The L Odd Buffer Write Control signal is applied on line 420 to each of these circuits. The complement value of the bit position 21 of the address is applied on line 186-1 as an input signal to AND circuit 482. The true value of the bit position 21 of the address is applied on line 186-2 as an input to AND circuit 480. Thus, when the L Hit condition is present, and the L Odd Buffer Write Control signal is present, AND circuit 480 will provide the L Enable OS Hit A signal on line 422 when bit position 21 of the address is a binary 1. Alternatively, AND circuit 482 will provide the L Enable ES Hit A signal on line 424 when address bit position 21 is a binary 0.

Returning to a consideration of FIG. 4, it can be seen that the Even Buffer Write Enable circuitry 406 utilizes the L Enable OS Hit signals from line 416, L Enable ES Hit signals on line 418, in conjunction with the Odd Set Block signals on line 134 and the Even Set Block Hit signals on line 132 for generating the Even Word Buffer Write Enable signals on line 184. A specialized control set of signals is received on line 198-E from the Aging and Block Replacement Control 138. These specialized control signals will be described in more detail below, but in essence are utilized for the control of the replacement of designated blocks. The Odd Buffer Write Enable Control circuitry 408 utilizes the L Enable OS Hit A signals on line 422 and the L Enable ES Hit A on line 424 in conjunction with the Odd Set Block Hit signals on line 134 and the Even Set Block Hit signals from line 132 to generate the Odd Word Buffer Write Enable on line 196. As previously mentioned, specialized control signals are received on line 198-0 from the Aging and Block Replacement Control 138.

Figure 11:
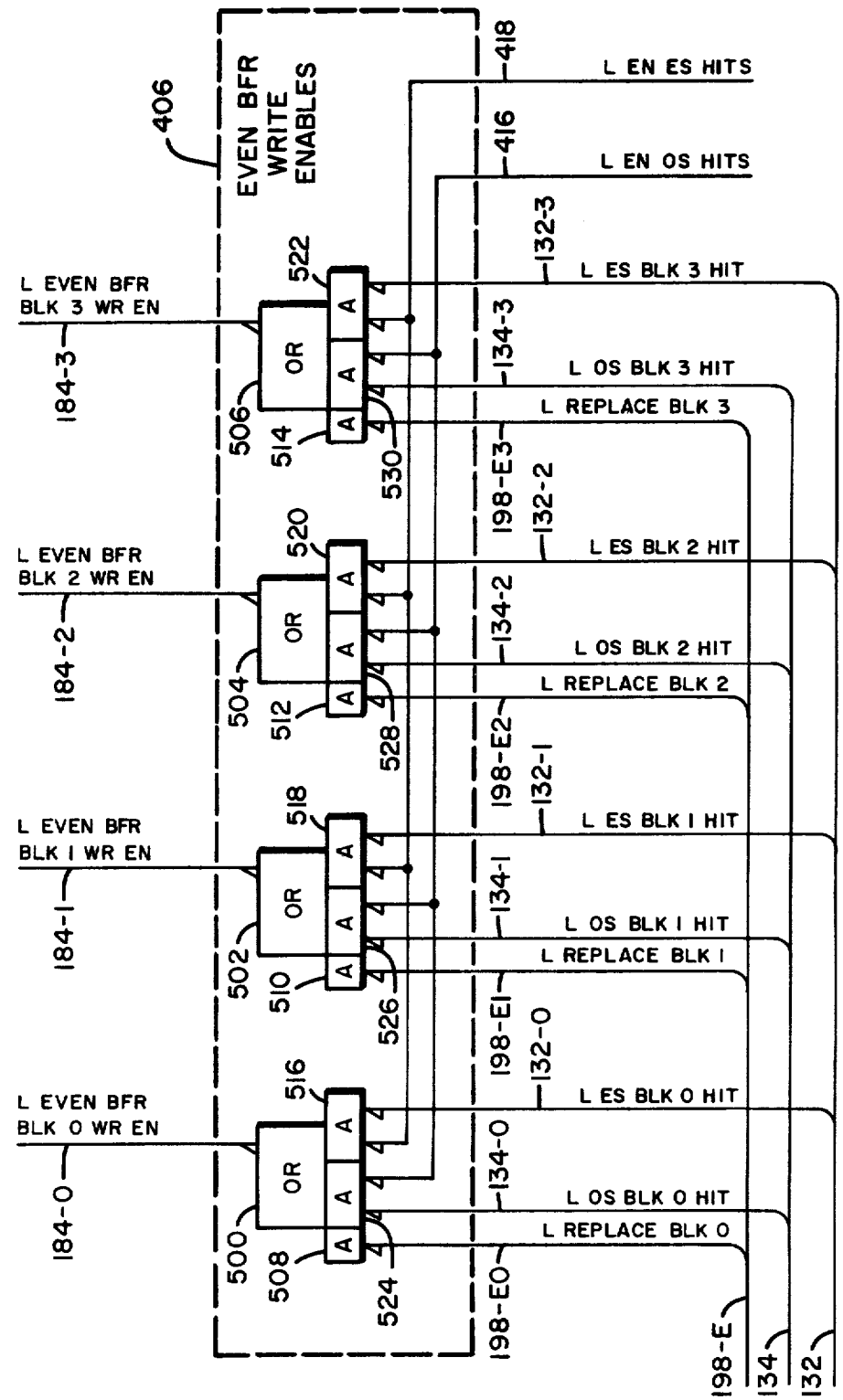
FIG. 11 is a detailed logic block diagram of the Even Buffer Write Enable circuit.
Figure 12:
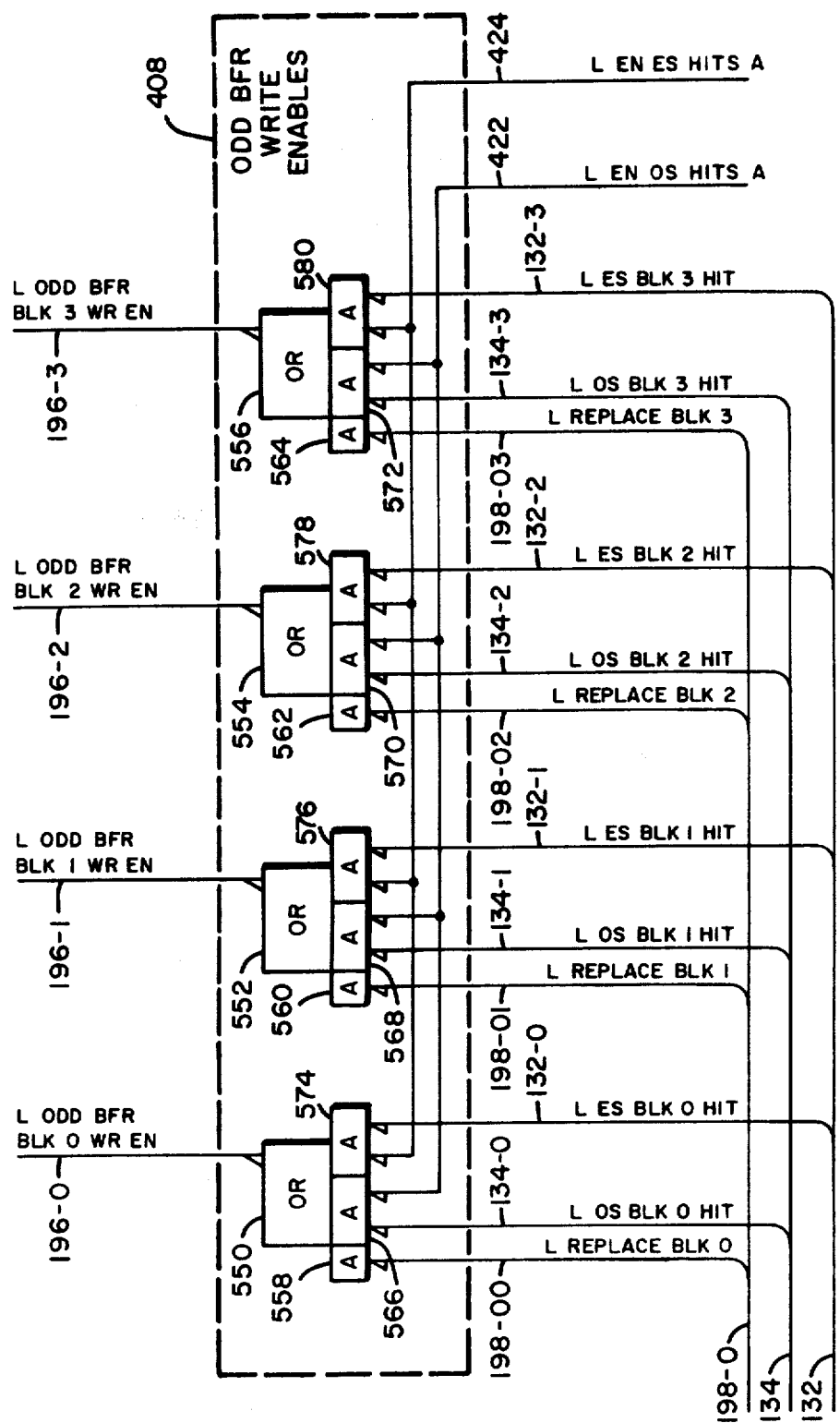
FIG. 12 is a detailed logic block diagram of the Odd Buffer Write Enable circuit.

The generation of the Write Enable can best be understood from a consideration of FIG. 11 which illustrates the Even Buffer Write Enable circuitry, shown within dashed block 406, and FIG. 12, which illustrates the Odd Buffer Write Enable circuitry enclosed within dashed block 408.

The Even Buffer Write Enable circuitry 406 includes four 3-input OR circuits 500, 502, 504, and 506. Single-input AND circuits 508, 510, 512, and 514 supply input signals to OR circuits 500, 502, 504, and 506 respectively, and are each arranged for receiving an associated one of the block replacement signals from Aging and Block Replacement Control 138 via line 198-E. The four lines result in the L Replace Block 0 being applied on line 198-E0 to AND circuit 508, the L Replace Block 1 being applied on line 198-E1 to AND circuit 510, the L Replace Block 2 being applied on line 198-E2 to AND circuit 512, and the L Replace Block 3 being applied on line 198-E3 to AND circuit 514. The availability of any or all of these Replace signals to the respective OR circuits will result in Write Enable signals being produced for the Even Buffer Block on the associated one of lines 184-0, 184-1, 184-2, and 184-3. A set of four 2-input AND circuits 516, 518, 520, and 522, are adapted to provide input signals to one of the associated input terminals for OR circuit 500, 502, 504, and 506, respectively, each of said AND circuits enabled by the L Enable ES Hit signals received on line 418. The Even Set Block Hit signals are applied on line 132 such that the L ES Block 0 Hit signal is applied on line 132-0 to AND circuit 516, the L ES Block 1 Hit signal is applied on line 132-1 to AND circuit 518, the L ES Block 2 Hit signal is applied on line 132-2 to AND circuit 520, and the L ES Block 3 Hit signal is applied on line 132-3 to AND circuit 522. When enabled by the L Enable ES Hit signal on line 418, the availability of any Even Set Block Hit signal will result in the associated OR circuit providing the appropriate Write Enable. Finally, a set of four 2-input AND circuits 524, 526, 528, and 530 are respectively coupled to the remaining input terminals of OR circuits 500, 502, 504, and 506, and have the L Enable OS Hit signal applied on line 416 as the enabling input thereto. The Odd Set Block Hit signals are applied on line 134, with L OS Block 0 Hit signal being applied on line 134-0 to AND circuit 524, the L OS Block 1 Hit signal being applied on line 134-1 to AND circuit 526, the L OS Block 2 Hit signal being applied on line 134-2 to AND circuit 528, and the L OS Block 3 Hit signal being applied on line 134-3 to AND circuit 530. Depending upon the status of the L Enable ES Hit signal on line 418 or the L Enable OS Hit signal on line 416, and the Even Set Block Hit signals or the L OS Block Hit signals, OR circuits 500, 502, 504, and 506 will provide the appropriate Write Enable signals at their respective outputs.

The Odd Buffer Write Enable circuitry is illustrated in detail in FIG. 12, as shown enclosed within dashed block 408, and operates much the same as the Write Enable circuitry just described for the Even Buffer. It includes four 3-input OR circuits 550, 552, 554, and 556, with one of the input terminals being coupled to a single input AND circuit 558, 560, 562, and 564, respectively. The Aging and Block Replacement Control 138 provides enabling signals on line 198-0 such that the L Replace Block 0 signal is directed on line 198-00 to AND circuit 558, the L Replace Block 1 signal is directed on line 198-01 to AND circuit 560, the L Replace Block 2 signal is directed on line 198-02 to AND circuit 562, and the L Replace Block 3 signal is directed on line 198-03 to AND circuit 564. The OS Block Hit signals are evaluated by a set of AND circuits 566, 568, 570, and 572, which are enabled by the L Enable OS Hit A control signals that is applied on line 422. The L OS Block 0 Hit signal is applied on line 134-0 to AND circuit 566, the L OS Block 1 Hit signal is applied on line 134-1 to AND circuit 568, the L OS Block 2 Hit signal is applied on line 134-2 to AND circuit 570, and the L OS Block 3 Hit signal is applied on line 134-3 to AND circuit 572. The ES Block Hit signals are evaluated by a set of four AND circuits 574, 576, 578, and 580, all of which are enabled at the appropriate time by the L Enable ES Hit A signal on line 424. The ES Block Hit signals are applied on line 132, with the L ES Block 0 Hit signal being applied on line 132-0 to AND circuit 574, the L ES Block 1 Hit signal being applied on line 132-1 to AND circuit 576, the L ES Block 2 Hit signal being applied on line 132-2 to AND circuit 578, and the L ES Block 3 Hit signal being applied on line 132-2 to AND circuit 580. Thus it can be seen that the application of any Replace Block signal to any of the OR circuits 550, 552, 544, and 556 will result in the generation of a Write Enable on any output line 196-0, 196-1, 196-2, and 196-3 that are associated with an activated 1 of the OR circuits. Similarly, the OR circuits will be responsive to either OS Block Hit signals or ES Block Hit signals dependent upon the state of the enable signals that are applied on lines 422 and 424.

From the foregoing detailed description of the operation of the writing function of the system, it can be seen that the objective of providing a Buffer System that allows the writing of two data words simultaneously during a single buffer cycle has been accomplished. The further objective of providing a system that allows the writing of two data words at consecutive addresses in a Buffer System where a boundary crossing exists has also been satisfied.

It should be understood that the specific timing of the subject invention would be dependent upon the Buffer System in which it is utilized, and it would further be based on the specific selection of circuits that would implement the logic configuration described. The timing would be readily apparent to those skilled in the art for the system parameters and the circuit selection that would be utilized. It is clear further, that not every combination of events capable to be handled by the system has been described by specific examples, but with the description of the circuit operation and the system parameters, and the description of the example situations, one skilled in the art can trace the signals through the circuits operation to derive the specific reading or writing control signals for which the invention was designed. It can be seen, then, that the stated purposes and objectives of the invention have been satisfied and fully described, and what is intended to be protected by Letters Patent is set forth in the appended claims.

What is claimed is:

1. In a set associative memory system having an addressable main memory for storing data words arranged in blocks and sets, first and second buffer memories coupled to said main memory for storing associated blocks of data words including addressed ones of the data words, and means for receiving two consecutive addresses of two data words to be accessed from said main memory or said first and second buffer memories, a two data word access control comprising:

residency determining means for determining whether two consecutive addressed data words are resident in the buffer memories, and for providing first signals indicative of residency of either or both of said two consecutive addressed data words and second signals indicative of non-residency of either or both of said two consecutive addressed data words; and access means coupled to said residency determining means for simultaneously accessing said two consecutive addressed words in response to said first signals.

2. A two data word access control as in claim 1 wherein said access means includes reading means for simultaneously selecting first and second addressed data words from first and second groups of data words read from said first and second buffer memories; and writing means for simultaneously writing first and second addressed data words in said first and second buffer memories.

3. A two data word access control as in claim 2 wherein said first and second buffer memories are adapted for storing even address data words and odd address data words, respectively, and said first and second buffer memories are block addressable, where each of said blocks is comprised of a predetermined plurality of data words, and said access means further includes boundary crossing means responsive to said two consecutive addresses for providing block boundary crossing access to said two data words across a block boundary when so addressed.

4. A two data word access control as in claim 3 wherein said access means further includes a data block replacement call means for activating block replacement calls to the main memory to provide blocks of data words containing addressed data words not resident in said first and second buffer memories in response to said second signals.

5. A two data word access control as in claim 4 wherein said residency determining means includes first and second tag storage means for storing tags indicative of the blocks of data stored in said first and second buffer memories, the tags of individual words to be accessed specified in the word address;

comparison means for comparing tags specified in said first and second addresses to tags stored in said first and second tag storage means and providing block hit signals indicative of the presence or absence of either block of data words referenced by said first and second addresses;

hit and miss determining means wherein said first signals include hit signals for each of said two addressed data words found resident in said first and second buffer memories, and said second signals include miss signals for each of said two addressed data words not found resident in said first and second buffer memories; and access enabling means coupled to said hit and miss determining means for providing access enabling signals when both of said two addressed data words are determined to be resident in said first and second buffer memories.

6. A two data word access control as in claim 5 where even address words are stored in said first buffer memory and odd address words are stored in said second buffer memory, wherein said comparison means includes even set comparison means for comparing address tags to tags stored in said first tags storage means for providing even set block hit signals when equality is detected; and odd set comparison means for comparing address tags to tags stored in said second tag storage means for providing odd set block hit signals when equality is detected.

7. A two data word access control as in claim 6 wherein said hit and miss determining means includes even set hit and miss determining means coupled to said even set comparison means for providing even set hit signals for addressed words found resident and even set miss signals for addressed words not found resident;

odd set hit and miss determining means coupled to said odd set comparison means for providing odd set hit signals for addressed words found resident and odd set miss signals for addressed words not found resident.

8. A two data word access control as in claim 7 wherein said access means includes even word select means coupled to said access enabling means, said even set comparison means and said odd set comparison means for providing first word selection codes for reading an addressed word from said first buffer memory; and odd word select means coupled to said access enabling means, said even set comparison means and said odd set comparison means for providing second word selection codes for reading from said second buffer memory.

9. A two data word access control as in claim 8 wherein said access means includes write function register means for receiving and storing writing function control signals;

even buffer write control means coupled to said function register means and said access enabling means for providing first odd set hit enabling signals in response to first address sequences and first even set bit enabling signals in response to second address sequences, and having odd buffer write output control means for providing odd buffer write control signals;

odd buffer write control means coupled to said access enabling means and said odd buffer write control output means for providing second odd set hit enabling signals in response to first address sequences and second even set hit enabling signals in response to second address sequences;

even buffer write enable means coupled to said buffer write control means, said even set comparison means and said odd set comparison means for selecting said even set comparison means in response to said first even set hit enabling signals and selecting said odd set comparison means in response to said first odd set hit enabling signals for providing even buffer write enable signals; and odd buffer write enable means coupled to said odd buffer write control means, said even set comparison means, and said odd set comparison means for selecting said even set comparison means in response to said second even set enabling signal and selecting said odd set comparison means in response to said second odd set enabling signals for providing odd buffer write enable signals, whereby two data words can be simultaneously written during a buffer memory cycle.

10. In a set associative memory system having a main memory for storing data words arranged in blocks and sets, first and second buffer memories coupled to said memory, and addressing circuits for applying first and second consecutive addresses of two data words to be read or written, said first and second buffer memories arranged for storing blocks of data words associatively arranged in sets, and first and second tag storage devices for storing tags representing portions of the main memory addresses for words currently stored in said first and second buffer memories, and replacement control circuitry for replacing any block of data words in said first and second buffer memories from said main memory when it is determined that either or both of the words specified by said first and second addresses are not resident in said first and second buffer memories, the improvement of two data word access control comprising:

comparison means for comparing first and second consecutive addresses received to tags stored in said first and second buffer memories and providing signals indicative of the presence or absence of either block of data words referenced;

hit and miss determining means for providing a hit signal for each of said two data words specified by said first and second addresses found resident in said first and second buffer memories, and a miss signal for each of said two data words not found resident in said first and second buffer memories; and two data word access selection means coupled to said hit and miss determining means for providing access to said two data words addressed during an access cycle of said first and second buffer memories in response to said hit signals.

11. A two data word access control as in claim 10 wherein said two data word access selection means includes read word selection means coupled to the said hit and miss determining means for selecting the two data words addressed and read from said first and second buffer memories; and write word selection means coupled to said hit and miss determining means for writing the two data words addressed in said first and second buffer memories.

12. A two data word access control as in claim 11 wherein said two data word selection means includes block boundary crossing means responsively coupled to said comparison means and said hit and miss determining means for providing simultaneous access to two consecutively addressed data words situated in separate blocks of data words.

13. A two data word access control as in claim 12 wherein said block boundary crossing means includes address sensing means for sensing the relationship of a pair of consecutive word addresses and alternatively providing first signals indicative of block boundary crossing and second signals indicative of non-block boundary crossings.

14. A two data word access control as in claim 13 wherein said two data word access selection means includes access enabling means coupled to said hit and miss determining means for providing access enabling signals when both of said two addressed words are determined to be resident in said first and second buffer memories.

15. A two data word access control as in claim 14 where even address words are stored in said first buffer memory and odd address words are stored in said second buffer memory, wherein said comparison means includes even set comparison means for comparing address tags to tags stored in the first means for storing tags for providing even set block hit signals when equality is detected; and odd set comparison means for comparing address tags to tags stored in the second means for storing tags for providing odd set block hit signals when equality is detected.

16. A two data word access control as in claim 15 wherein said hit and miss determining means includes even set hit and miss determining means coupled to said even set comparison means for providing even set signals for address words found resistant and even set miss signals for address words not found resident; and odd set hit and miss determining means coupled to said odd set comparison means for providing odd set hit signals for address words found resident and odd set miss signals for address words not found resident.

17. A two data word access control as in claim 16 wherein said two data word access selection means includes even word select means coupled to said access enabling means, said even set comparison means and said odd set comparison means for providing first word selection codes for reading one addressed word from said first buffer memory; and odd word select means coupled to said access enabling means, said even set comparison means and said odd set comparison means for providing second word selection codes for reading from said second buffer memory.

18. A two data word access control as in claim 17 wherein said write word selection means includes write function register means for receiving and storing writing function control signals;

even buffer write control means coupled to said function register means and said access enabling means for providing first odd set hit enabling signals in response to first address sequences and first even set hit enabling signals in response to second address sequences, and having odd buffer write output control means for providing odd buffer write control signals;

odd buffer write control means coupled to said access enabling means and said odd buffer write control output means for providing second odd set hit enabling signals in response to first address sequences and second even set hit enabling signals in response to second address sequences;

even buffer write enable means coupled to said buffer write control means, said even set comparison means and said odd set comparison means for selecting said even set comparison means in response to said first even set hit enabling signals and selecting said odd set comparison means in response to said first odd set hit enabling signals for providing even buffer write enable signals; and odd buffer write enable means coupled to said odd buffer write control means, said even set comparison means and said odd set comparison means for selecting said even set comparison means in response to said second even set enabling signals and selecting said odd set comparison means in response to said second odd set hit enabling signals for providing odd buffer write enabling signals, whereby two data words can be simultaneously written.

19. In a set associative memory system having a main memory for storing data words arranged in sets wherein each set includes a predetermined number of blocks of data words and each block of data words includes a predetermined number of data words wherein data words are read or written on a block-by-block basis, an even word buffer memory coupled to said memory for storing even address data words, an odd word buffer memory coupled to said memory for storing odd address data words, a first tag storage for storing tags of words stored in either of said word buffer memories, a second tag storage for storing tags of words stored in either of said word buffer memories, an aging block replacement control coupled to said memory and even word buffer and said odd word buffer for replacing blocks of data words in said even word buffer memory and said odd word buffer memory when it is determined that either or both access data words are not resident therein, the improvement of two data word access control comprising:

address means for receiving an address of a data word to be accessed including a tag field, an address field including a set address field and a word address field;

address plus one means for receiving an address of consecutively addressed data word to be accessed, including a partial set address field and a word address field;

tag storage reading means coupled to said address means and said address plus one means for reading out a first group of selected tags from the first tag storage and a second group of tags from the second tag storage;

even set match compare means coupled to said address means for simultaneously comparing said tage field to said first group of tags, said even set match compare means including even set match output means equal in number to said first group for providing even set block compare signals when said tag field matches one of said first group of tags;

odd set match compare means coupled to said address means for simultaneously comparing said tag field to said second group of tags, said odd set match compare means including odd set match output means equal in number to said second group for providing odd set block compare signals when said tag field matches one of said second group of tags;

even set hit and miss means coupled to said even set match compare means, said address field of said address means, and said word address field of said address plus one means for providing even set hit and miss signals in response thereto;

odd set hit and miss means coupled to said odd set match compare means, said address field of said address means, and said word address field of said address plus one means for providing odd set hit and miss signals in response thereto;

access enabling means coupled to said even set hit and miss means and said odd set hit and miss means for providing access enable signals when both accessed data words are determined to be resident in the even and odd word buffer memories;

even buffer selector and address generation means coupled to said access enabling means, said even set match compare means, said odd set match compare means, said address field of said address means and said word address field of said address plus one means for generating even buffer word selection codes for selecting and reading one of a plurality of available words from said even word buffer;

odd buffer selector and address generation means coupled to said access enabling means, said even set match compare means, said odd set match compare means, said address field of said address means and said word address field of said address plus one means for generating odd buffer word selection codes for selecting and reading one of a plurality of available words from said odd word buffer;

writing function register means for receiving and storing writing function control signals;

even buffer write control means coupled to said function register means said access enabling means, said address field of said address means and said word address field of said address plus one means for providing first odd set hit enabling signals in response to first address sequences and first even set hit enabling signals in response to second address sequences, and having odd buffer write control output means for providing odd buffer write control signals;

odd buffer write control means coupled to said access enabling means, said address field of said address means, and said odd buffer write control output means for providing second odd set hit enabling signals in response to first address sequences and second even set hit enabling signals in response to second address sequences;

even buffer write enabling means coupled to said even buffer write control means, said even set match compare means and said odd set match compare means for selecting said even set match compare means in response to said first even set hit enabling signals and selecting odd set match compare means in response to said first odd set hit enabling signals for providing even buffer write enable signals; and odd buffer write enabling means coupled to said odd buffer write control means, said even set match compare means, and said odd set match compare means for selecting said even set match compare means in response to said second even set enabling signals and selecting said odd set match compare means in response to said second odd set hit enabling signals for providing odd buffer write enabling signals, whereby two data words can be simultaneously read or written during a buffer memory cycle.

20. A two data word access control as in claim 19 and further including block boundary crossing means responsively coupled to said address field of said address means and said word address field of said address plus one means for providing simultaneous access to two consecutively address data words situated in separate blocks of data words.

21. A two data word access control as in claim 20 wherein said block boundary cross means includes address sensing means and address plus one sensing means for sensing the relationship of a pair of consecutive word addresses and alternatively providing first signals indicative of block boundary crossing and second signals indicative of non-block boundary crossing.

22. In a set associative memory system having an addressable main memory, a two data word access control comprising:

first and second buffer memory means coupled to said memory system for storing blocks of data words with even addressed ones of said data words stored in said first buffer memory means and odd addressed ones of said data words stored in said second buffer memory means;

addressing means for specifying predetermined consecutive addresses of two data words to be accessed;

residency determining means coupled to said addressing means for determining whether two consecutive addressed data words are resident in said first and second buffer memories and for providing first signals indicative of residency of either or both of said two consecutive addressed data words and second signals indicative of non-residency of either or both of said two consecutive addressed data words;

access means coupled to said residency determining means for simultaneously accessing said two consecutive addressed words in response to said first signals, said access means including reading means for simultaneously selecting first and second addressed data words from first and second groups of data words read from said first and second buffer memories, and writing means for simultaneously writing first and second addressed data words in said first and second buffer memories, and boundary crossing means responsive to said two consecutive addresses for providing block boundary crossing access to said two addressed data words across a block boundary when so addressed.

* * * * *